United States Patent
Katoh

(10) Patent No.: US 9,989,317 B2
(45) Date of Patent: *Jun. 5, 2018

(54) HEAT EXCHANGER

(71) Applicant: DENSO CORPORATION, Kariya, Aichi-pref. (JP)

(72) Inventor: Yoshiki Katoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 117 days.

This patent is subject to a terminal disclaimer.

(21) Appl. No.: 14/655,471

(22) PCT Filed: Dec. 5, 2013

(86) PCT No.: PCT/JP2013/007140
§ 371 (c)(1),
(2) Date: Jun. 25, 2015

(87) PCT Pub. No.: WO2014/103189
PCT Pub. Date: Jul. 3, 2014

(65) Prior Publication Data
US 2015/0338173 A1    Nov. 26, 2015

(30) Foreign Application Priority Data

Dec. 27, 2012 (JP) ................. 2012-285569

(51) Int. Cl.
*F28F 1/10* (2006.01)
*F28F 1/12* (2006.01)
(Continued)

(52) U.S. Cl.
CPC .......... *F28F 1/12* (2013.01); *B60H 1/00328* (2013.01); *B60H 1/00335* (2013.01);
(Continued)

(58) Field of Classification Search
CPC .... F28D 1/0408; F28D 1/0417; F28D 1/0426; F28D 1/05308; F28D 1/05325;
(Continued)

(56) References Cited

U.S. PATENT DOCUMENTS 5,653,283 A    8/1997   Yoshii et al.
6,209,628 B1   4/2001   Sugimoto et al.
(Continued)

FOREIGN PATENT DOCUMENTS

DE    10314782 A1   10/2003
JP    10-253276      9/1998
(Continued)

OTHER PUBLICATIONS

Katoh et al., U.S. Appl. No. 14/442,055, filed May 11, 2015. Entire document.*

(Continued)

*Primary Examiner* — Davis Hwu
(74) *Attorney, Agent, or Firm* — Harness, Dickey & Pierce, P.L.C.

(57) ABSTRACT

In a heat exchanger, an outside air passage, through which outside air flows, is provided between adjacent tubes of the refrigerant tube and the coolant tubes. Disposed in the outside air passage is an outer fin joined to at least one of the refrigerant tube and the coolant tube and configured to accelerate heat transfer between the fluids. A dimension of the refrigerant tube in a flow direction of the outside air is different from a dimension of the coolant tube in the flow direction of the outside air. Hence, with respect to the outer fin joined to both of the refrigerant tube and the coolant tube, an area of a joint surface between the refrigerant tube and the outer fin is different from an area of a joint surface between the coolant tube and the outer fin.

15 Claims, 18 Drawing Sheets

(51) Int. Cl.
  *B60H 1/00* (2006.01)
  *F28D 1/04* (2006.01)
  *F28D 1/053* (2006.01)
  *F28F 9/02* (2006.01)
  *F28F 1/16* (2006.01)

(52) U.S. Cl.
  CPC ....... *F28D 1/0435* (2013.01); *F28D 1/05391* (2013.01); *F28F 1/126* (2013.01); *F28F 9/0278* (2013.01); *F28F 1/16* (2013.01); *F28F 9/0224* (2013.01); *F28F 2215/02* (2013.01); *F28F 2215/06* (2013.01)

(58) Field of Classification Search
  CPC .... F28D 1/05333; F28D 1/05341; F28F 1/12; F28F 1/126; F28F 9/0278; F28F 9/0224; F28F 1/16
  USPC .................................. 165/135, 140, 172, 174
  See application file for complete search history.

(56) References Cited

U.S. PATENT DOCUMENTS

| | | | |
|---|---|---|---|
| 2003/0188857 | A1 | 10/2003 | Kawakubo et al. |
| 2004/0060316 | A1 | 4/2004 | Ito et al. |
| 2005/0006068 | A1* | 1/2005 | Desai .................. F28D 1/0443 165/140 |
| 2007/0277956 | A1 | 12/2007 | Bergmiller et al. |
| 2008/0029254 | A1* | 2/2008 | Sekito ................ F28D 1/05366 165/148 |
| 2009/0173478 | A1* | 7/2009 | Beamer .................. F25B 39/02 165/151 |
| 2011/0240271 | A1* | 10/2011 | Mross ................. F28D 1/05391 165/166 |
| 2013/0061631 | A1 | 3/2013 | Katoh |
| 2014/0245777 | A1 | 9/2014 | Katoh et al. |
| 2014/0305159 | A1 | 10/2014 | Katoh et al. |
| 2014/0318749 | A1* | 10/2014 | Katoh ................ B60H 1/00328 165/140 |
| 2015/0241131 | A1* | 8/2015 | Katoh ................ F28D 1/05366 165/140 |

FOREIGN PATENT DOCUMENTS

| | | |
|---|---|---|
| JP | H11264675 A | 9/1999 |
| JP | 2004-131058 | 4/2004 |
| JP | 2004163036 A | 6/2004 |
| JP | 2006207377 A | 8/2006 |
| JP | 2012007821 A | 1/2012 |
| JP | 2012225638 A | 11/2012 |
| JP | 2013137183 A | 7/2013 |

OTHER PUBLICATIONS

Office Action dated Aug. 18, 2015 in corresponding Japanese Application No. 2012-285569.

International Search Report and Written Opinion (in Japanese with English Translation) for PCT/JP2013/007140, mailed Feb. 10, 2014; ISA/JP.

* cited by examiner

FIG. 3

COOLING OPERATION

FIG. 21  HEATING OPERATION

WARMING-UP OPERATION

FIG. 23  COOLING OPERATION

HEAT EXCHANGER

CROSS REFERENCE TO RELATED APPLICATIONS

This application is a U.S. National Phase Application under 35 U.S.C. 371 of International Application No. PCT/JP2013/007140 filed on Dec. 5, 2013 and published in Japanese as WO 2014/103189 A1 on Jul. 3, 2014. This application is based on and claims the benefit of priority from Japanese Patent Application No. 2012-285569 filed on Dec. 27, 2012. The entire disclosures of all of the above applications are incorporated herein by reference.

TECHNICAL FIELD

The present disclosure relates to a combined heat exchanger configured to allow three types of fluid to exchange heat thereamong.

BACKGROUND ART

Conventionally, a combined heat exchanger configured to be capable of exchanging heat among three types of fluid is known. For example, in a heat exchanger disclosed in Patent Document 1, a combined heat exchanger is configured to be capable of exchanging heat between a refrigerant of a refrigeration cycle and outdoor air (outside air), and exchanging heat between coolant for cooling engine and the outside air.

Specifically, in the heat exchanger of Patent Document 1, refrigerant tubes in which the refrigerant flows and coolant tubes in which the coolant for an external heat source flows are arranged alternately in a stacked manner. Outer fins are arranged in outside air passages through which the outside air flows. Each of the outer fins is provided between the refrigerant tube and the coolant tube adjacent to each other and configured to allow heat transfer between the refrigerant tubes and the coolant tubes. Accordingly, not only the heat exchanges between the refrigerant and the blown air and between the coolant and blown air, but also the heat exchange between the refrigerant is the coolant can be achieved.

Therefore, for example, at the time of defrosting for removing frost attached to the refrigerant tubes, heat of the coolant can be transferred to the entire area of the refrigerant tube, so that the heat of the coolant can be effectively used.

PRIOR ART DOCUMENT

Patent Document

Patent Document 1: JP 2012-7821

SUMMARY OF THE INVENTION

However, according to the study of the inventor of this application, only by simply arranging the refrigerant tubes and the coolant tubes alternately as the heat exchanger of Patent Document 1, the heat of the coolant may become excessive as compared with a heat required for defrosting.

In contrast, the inventor of the present application proposes a heat exchanger including an upstream side heat exchanging unit arranged on an upstream side in an air flowing direction and a downstream side heat exchanging unit arranged on a downstream side of the upstream side heat exchanging unit in the air flowing direction, wherein a rate of the number of refrigerant tubes with respect to the total number of tubes which constitute the upstream side heat exchanger is differentiated from a rate of the number of the refrigerant tubes with respect to the total number of tubes which constitute the downstream side heat exchanging unit in Patent Application No. 2012-62935 (hereinafter, referred to as "example of preceding application") Accordingly, adjustment of the heat exchange amounts among three types of fluid is achieved as the entire heat exchanger.

However, only by differentiating the rate of the number of refrigerant tubes in the upstream side heat exchanging unit from the rate of the number of refrigerant tubes in the downstream side heat exchanging unit as in the example of preceding application, the adjustment of the heat exchange amounts among the three types of fluid may be insufficient.

In view of such points, it is an objective of the present disclosure to provide a heat exchanger capable of finely adjusting heat exchange amounts among three types of fluid.

According to a first aspect of the present disclosure, a heat exchanger includes (i) a heat exchanging unit including at least one of first tubes, in which a first fluid flows, and second tubes, in which a second fluid flows, the at least one of the first tubes and the second tubes being arranged in a stacked manner, the heat exchange unit allowing at least one of the first fluid and the second fluid to exchange heat with a third fluid, (ii) third fluid passages each of which is a space provided between adjacent tubes of the first tubes and the second tubes, the third fluid flowing through the third fluid passages, and (iii) outer fins that are disposed in the third fluid passages and joined to at least one of outer surfaces of the first tubes and outer surfaces of the second tubes, the outer fins accelerating heat transfer between the fluids. At least one of the outer fins is joined to both of the first tubes and the second tubes. An area of a joint surface between the first tubes and the at least one of the outer fins is different from an area of a joint surface between the second tubes and the at least one of the outer fins. A dimension of the first tubes joined to the at least one of the outer fins in a flow direction of the third fluid is different from a dimension of the second tubes joined to the at least one of the outer fins in the flow direction of the third fluid.

In this configuration, the outer fin is joined to both of the first tubes and the second tubes, and the dimension of the first tubes in the flow direction of the third fluid is different from the dimension of the second tubes in the flow direction of the third fluid. Hence, the area of the joint surface between the first tubes and the outer fin is different from the area of the joint surface between the second tubes and the outer fin. Accordingly, the heat exchange amounts among three types of fluids can be adjusted precisely as the entire heat exchanger. In other words, by varying the dimension of the first tubes in the flow direction of the third fluid and the dimension of the second tubes in the flow direction of the third fluid joined to the outer fin, the heat exchange amounts among the three types of fluids can be adjusted precisely.

According to a second aspect of the present disclosure, a heat exchanger includes (i) a heat exchanging unit including at least one of first tubes in which a first fluid flows and second tubes in which a second fluid flows, the at least one of the first tubes and the second tubes being arranged in a stacked manner, the heat exchange unit allowing at least one of the first fluid and the second fluid to exchange heat with a third fluid, (ii) third fluid passages each of which is a space provided between adjacent tubes of the first tubes and the second tubes, the third fluid flowing through the third fluid passages, and (iii) outer fins that are disposed in the third fluid passages and joined to at least one of outer surfaces of the first tubes and outer surfaces of the second tubes, the outer fins accelerating heat transfer between the fluids. At least one of the outer fins is joined to both of the first tubes and the second tubes. An area of a joint surface between the first tubes and the at least one of the outer fins is different from an area of a joint surface between the second tubes and the at least one of the outer fins. A number of the first tubes joined to the at least one of the outer fins and arranged in a flow direction of the third fluid is different from a number of the second tubes joined to the at least one of the outer fins and arranged in the flow direction of the third fluid.

In this configuration, the outer fins is joined to both of the first tubes and the second tubes, and the number of the first tubes arranged in the flow direction of the third fluid and the number of the second tubes arranged the flow direction of the third fluid are different. Hence, the area of the joint surface between the first tubes and the outer fin is different from the area of the joint surface between the second tubes and the outer fin. Accordingly, the heat exchange amounts among three types of fluid can be adjusted precisely as the entire heat exchanger. In other words, by varying the number of the first tubes arranged in the flow direction of the third fluid and the number of the second tubes arranged in the flow direction of the third fluid, which are joined to the outer fins, the heat exchange amounts among the three types of fluid can be adjusted precisely.

The expression "the most downstream portions of the one tubes in the flow direction of the third fluid are arranged on the upstream side, in the flow direction of the third fluid, of the most downstream portions of the other tubes in the flow direction of the third fluid" does not have a meaning that the most downstream portions of the one tubes in the flow direction of the third fluid are disposed by a quite small distance on the upstream side, in the flow direction of the third fluid, of the most downstream portions of the other tubes in the flow direction of the third fluid due to a manufacture error or an assembly error. The expression means that the most downstream portions of the one tubes in the flow direction of the third fluid are arranged on the upstream side, in the flow direction of the third fluid, of the most downstream portions of the other tubes in the flow direction of the third fluid by several (for example 10%) or more of the dimension of the other tubes in the flow direction of the third fluid.

BRIEF DESCRIPTION OF THE DRAWINGS

FIG. 3 is a schematic diagram illustrating a cooling operation in a heat pump cycle of the first embodiment.

EMBODIMENTS FOR EXPLOITATION OF THE INVENTION

Figure 1:
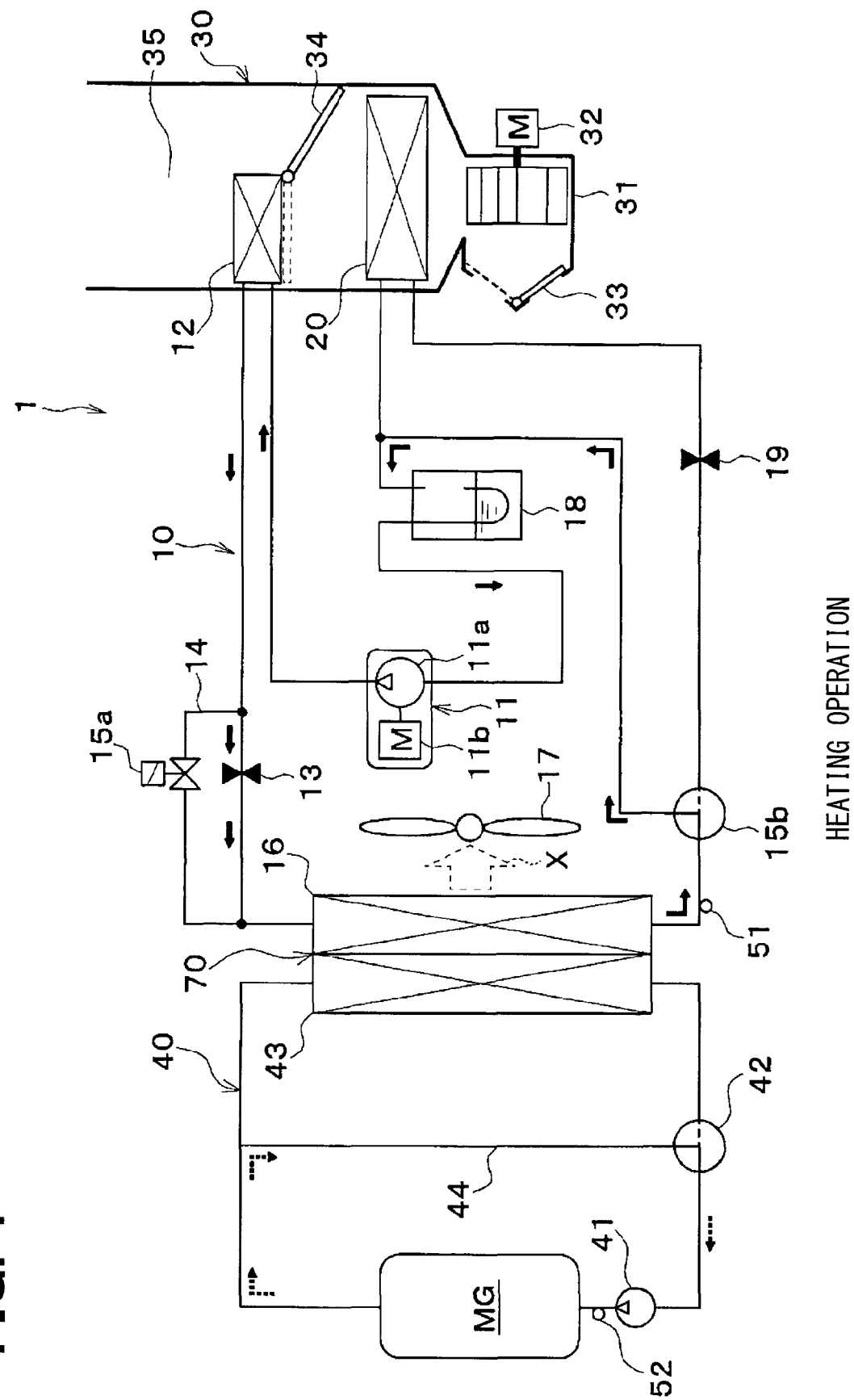
FIG. 1 is a schematic diagram illustrating a heating operation in a heat pump cycle of a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
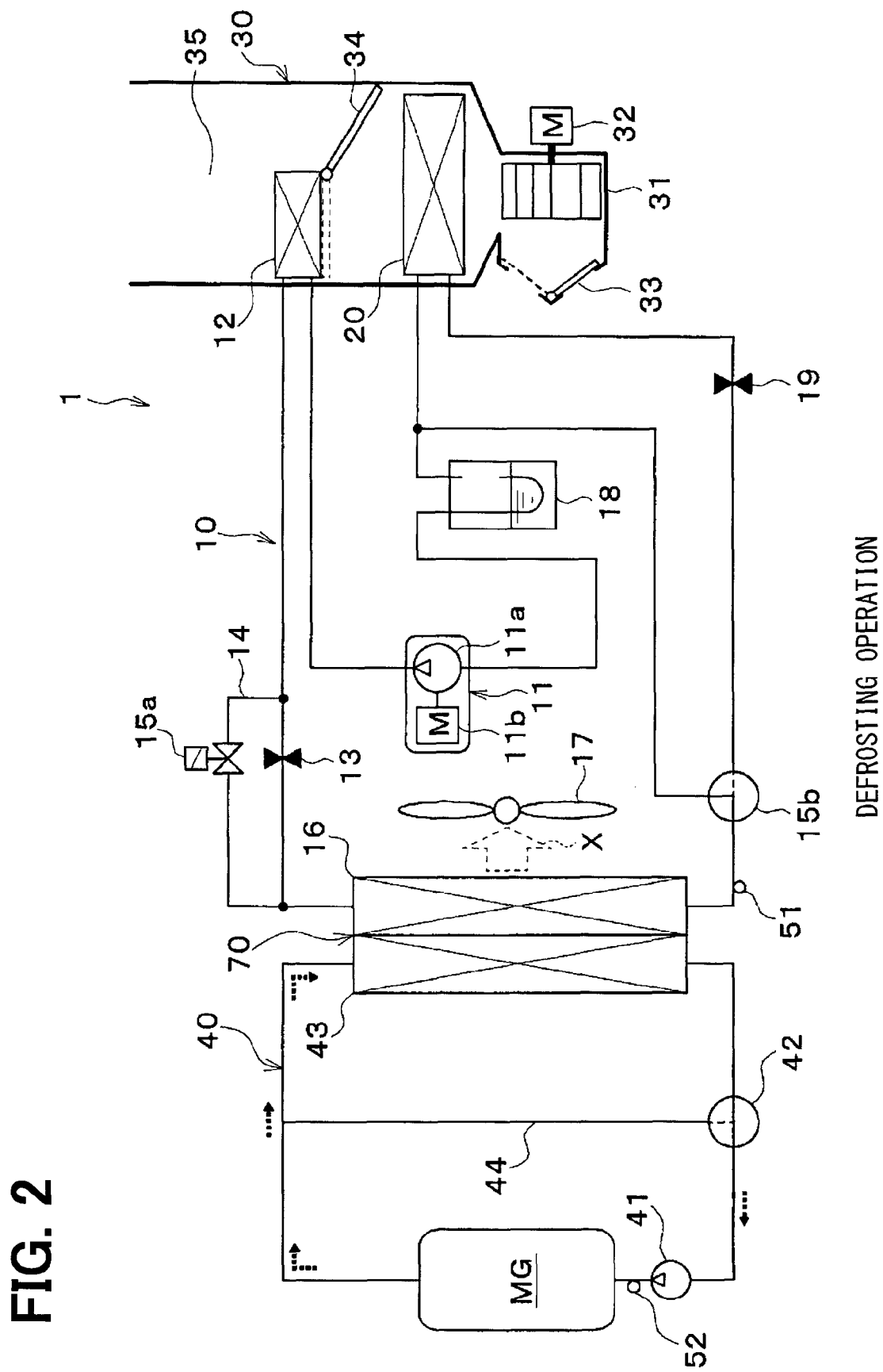
FIG. 2 is a schematic diagram illustrating a defrosting operation in the heat pump cycle of the first embodiment.
Figure 3:
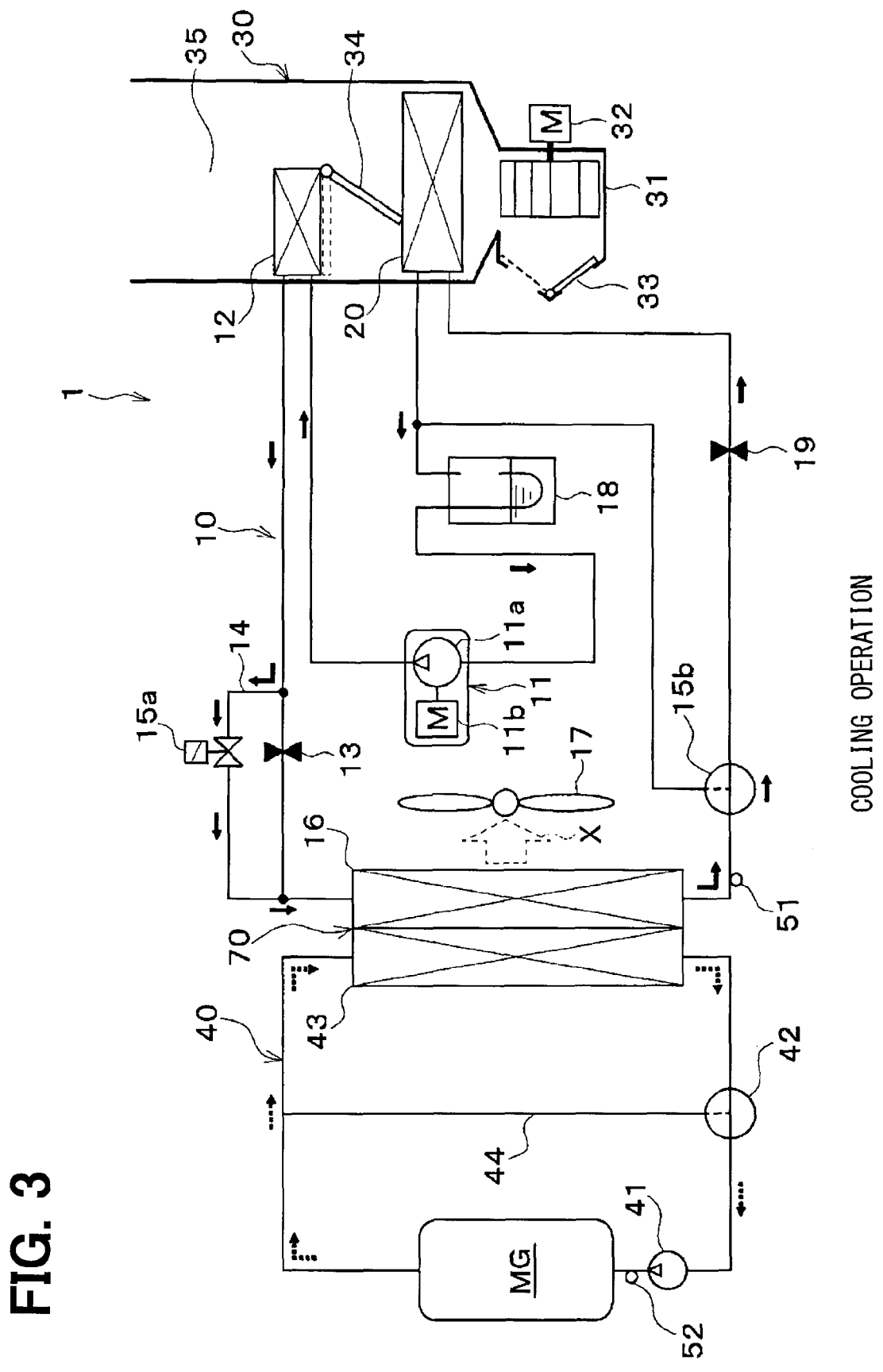

A first embodiment of the present disclosure will be described with reference to FIG. 1 to FIG. 9. In the present embodiment, a heat exchanger 70 of the present disclosure is applied to a heat pump cycle 10 configured to perform temperature adjustment of vehicle-interior blown air in a vehicle air conditioning apparatus 1. FIGS. 1 to 3 are drawings illustrating overall configurations of the vehicle air conditioning apparatus 1 of the first embodiment.

The vehicle air conditioning apparatus 1 is applied to a so-called hybrid vehicle that obtains a drive force for traveling a vehicle from an internal combustion engine (an engine) and a traveling electric motor MG.

The hybrid vehicle is capable of being switched between a traveling state in which the engine is started or stopped depending on a traveling load of the vehicle or the like and a drive force is obtained both from the engine and the traveling electric motor MG to travel and a traveling state in which the engine is stopped and the drive force is obtained only from the traveling electric motor MG to travel and other states. Accordingly, in the hybrid vehicle, an improvement of a vehicle fuel efficiency for normal vehicles which obtain the drive force for traveling the vehicle only from the engine is achieved.

The heat pump cycle 10 is a vapor compression refrigeration cycle having a function of heating or cooling the vehicle-interior blown air blown into a vehicle interior, which is a space to be air-conditioned, in the vehicle air conditioning apparatus 1. Therefore, the heat pump cycle 10 is capable of switching a refrigerant flow channel to execute a heating operation (a heat-up operation) for warming the vehicle interior by heating the vehicle-interior blown air, which is an object fluid of heat exchange, and a cooling operation (a refrigerating operation) for cooling the vehicle interior by cooling the vehicle-interior blown air.

In addition, in the heat pump cycle 10, an execution of a defrosting operation for melting and removing frost adhered to an outdoor heat exchanging unit 16 of the combined heat exchanger 70, which will be described later, configured to function as the evaporator for evaporating the refrigerant at the time of the heating operation is achieved. In the general configuration drawings illustrated in the heat pump cycle 10 of FIG. 1 to FIG. 3, flows of the refrigerant at the time of the respective operations are indicated by an arrow of a solid line.

The heat pump cycle 10 of the present embodiment employs a normal fluorocarbon refrigerant as the refrigerant, and constitutes a part of a subcritical refrigeration cycle in which a high pressure side refrigerant pressure does not exceed a critical pressure of the refrigerant. Freezer oil for lubricating a compressor 11 is mixed with the refrigerant, and a part of the refrigerant oil is circulated in the cycle together with the refrigerant.

First of all, the compressor 11 is an electric compressor arranged in an engine room and sucks, compresses, and discharges the refrigerant in the heat pump cycle 10, and is configured to drive a fixed capacity type compressor 11a with a fixed discharge capacity by an electric motor 11b. Specifically, various compression mechanisms such as a scroll-type compression mechanism and a vane-type compression mechanism can be employed as the fixed capacity type compressor 11a.

The operation (a number of rotations) of the electric motor 11b is controlled by a control signal that is output from an air-conditioning control apparatus, which will be described later, and any one of an AC motor and a DC motor may be employed as the electric motor 11b. A refrigerant discharging capacity of the compressor 11 changes according to the number-of-rotations control. Therefore, in the present embodiment, the electric motor 11b constitutes a part of discharge capacity change means of the compressor 11.

A refrigerant inlet side of an indoor condenser 12 as a using side heat exchanger is connected to a refrigerant discharge port of the compressor 11. The indoor condenser 12 is a heating heat exchanger arranged in an interior of a casing 31 of an indoor air conditioning unit 30 of the vehicle air conditioning apparatus 1 and configured to cause high-temperature high-pressure refrigerant that flows in the interior thereof and the vehicle-interior blown air after the passage through an indoor evaporator 20, which will be described later, to change heat with each other. A detailed configuration of the indoor air conditioning unit 30 will be described later.

A heating fixed throttle 13 as decompression means for the heating operation configured to decompress and expand a refrigerant that has flowed out from the indoor condenser 12 at the time of the heating operation is connected to a refrigerant outlet side of the indoor condenser 12. Examples of the heating fixed throttle 13 which may be employed here include an orifice and a capillary tube. A refrigerant inlet side of the outdoor heat exchanging unit 16 of the combined heat exchanger 70 is connected to an outlet side of the heating fixed throttle 13.

Furthermore, a fixed throttle bypassing passage 14 configured to cause the refrigerant that has flowed out from the indoor condenser 12 to bypass the heating fixed throttle 13 and guide the refrigerant toward the outdoor heat exchanging unit 16 is connected to the refrigerant outlet side of the indoor condenser 12. The fixed throttle bypassing passage 14 is arranged with an opening-and-closing valve 15a configured to open and close the fixed throttle bypassing passage 14. The opening-and-closing valve 15a is an electromagnetic valve an opening-and-closing operation of which is controlled by a control voltage output from the air-conditioning control apparatus.

A pressure loss generating when the refrigerant passes through the opening-and-closing valve 15a is extremely smaller than a pressure loss generating when the refrigerant passes through the fixed throttle 13. Therefore, the refrigerant that flows out from the indoor condenser 12 flows into the outdoor heat exchanging unit 16 via the fixed throttle bypassing passage 14 when the opening-and-closing valve 15a is opened, and flows into the outdoor heat exchanging unit 16 via the heating fixed throttle 13 when the opening-and-closing valve 15a is closed.

Accordingly, the opening-and-closing valve 15a is capable of switching the refrigerant flow channel in the heat pump cycle 10. Therefore, the opening-and-closing valve 15a of the present embodiment has a function as refrigerant flow channel switching means. Examples of the refrigerant flow channel switching means configured as described above which may be employed here include an electric three-direction valve configured to switch a refrigerant circuit that connects the outlet side of the indoor condenser 12 and the inlet side of the heating fixed throttle 13 and a refrigerant circuit that connects the outlet side of the indoor condenser 12 and an inlet side of the fixed throttle bypassing passage 14.

The outdoor heat exchanging unit 16 is a heat exchanging unit configured to cause the refrigerant that flows in the interior thereof and outside air blown from a blower fan 17 to exchange heat with each other in the heat exchanger 70. The outdoor heat exchanging unit 16 is arranged in an engine room and functions as an evaporating heat exchanging unit (evaporator) configured to evaporate the low-pressure refrigerant to bring out a heat absorbing effect at the time of the heating operation, and functions as a heat radiating heat exchanging unit (radiator) configured to radiate heat from the high-pressure refrigerant at the time of the cooling operation.

The blower fan 17 is an electric blower in which an operation rate, i.e. a number of rotations (an amount of blown air) of the electric blower is controlled by the control voltage output from the air-conditioning control apparatus.

Furthermore, the heat exchanger 70 of the present embodiment integrally includes a radiator unit 43, which will be described later, configured to cause the coolant for cooling the above-described outdoor heat exchanging unit 16 and the traveling electric motor MG and the outside air blown from the blower fan 17 to exchange heat with each other.

Therefore, the blower fan 17 of the present embodiment constitutes a part of exterior blowing means configured to blow the outside air toward both of the outdoor heat exchanging unit 16 and the radiator unit 43. A detailed configuration of the combined heat exchanger 70 including the outdoor heat exchanging unit 16 and the radiator unit 43 provided integrally will be described later.

An electric three-direction valve 15*b* is connected to the outlet side of the outdoor heat exchanging unit 16. The three-direction valve 15*b* is controlled in operation by a control voltage output from the air-conditioning control apparatus and constitutes a part of the refrigerant flow channel switching means together with the above-described opening-and-closing valve 15*a*.

More specifically, the three-direction valve 15*b* is configured to switch the flow channel to a refrigerant flow channel that connects an outlet side of the outdoor heat exchanging unit 16 and an inlet side of an accumulator 18, which will be described later, at the time of the heating operation, and to the refrigerant flow channel that connects the outlet side of the outdoor heat exchanging unit 16 and an inlet side of a cooling fixed throttle 19 at the time of the cooling operation.

The cooling fixed throttle 19 is decompression means for the cooling operation that decompresses and expands the refrigerant that has flowed out from the outdoor heat exchanging unit 16 at the time of the cooling operation, and the basic configuration is the same as that of the heating fixed throttle 13. A refrigerant inlet side of the indoor evaporator 20 is connected to an outlet side of the cooling fixed throttle 19.

The indoor evaporator 20 is a heat exchanger for cooling which is arranged on an upstream side of the indoor condenser 12 in the direction of the air flow within the casing 31 of the indoor air conditioning unit 30, and configured to cause the refrigerant that flows in the interior thereof and the vehicle-interior blown air to exchange heat with each other to cool the vehicle-interior blown air. The inlet side of the accumulator 18 is connected to a refrigerant outlet side of the indoor evaporator 20.

The accumulator 18 is a gas-liquid separator for the low-pressure side refrigerant that separates gas and liquid in the refrigerant flowing therein and accumulates surplus refrigerant in the cycle. An intake side of the compressor 11 is connected to a gas-phase refrigerant outlet of the accumulator 18. Therefore, the accumulator 18 has a function of restricting the liquid-phase refrigerant from being sucked into the compressor 11, and preventing liquid compression of the compressor 11.

In the heat pump cycle 10 of the present embodiment, the temperature of the coolant flowing out from the radiator unit 43 of the heat exchanger 70 at the time of the cooling operation becomes lower than the temperature of the refrigerant that flows out from the outdoor heat exchanging unit 16 of the heat exchanger 70. Accordingly, at the time of the cooling operation in which the outdoor heat exchanging unit 16 functions as a heat radiating heat exchanging unit configured to radiate heat of the high-pressure refrigerant, the degree of supercooling of the refrigerant that flows out from the outdoor heat exchanging unit 16 can be increased, so that an improvement of the cycle efficiency is achieved.

In contrast, in the heat pump cycle 10 of the present embodiment, the temperature of the coolant in the interior of the radiator unit 43 of the heat exchanger 70 at the time of the heating operation becomes higher than the temperature of the refrigerant that flows out from the outdoor heat exchanging unit 16 of the heat exchanger 70. Accordingly, at the time of the heating operation in which the outdoor heat exchanging unit 16 functions as the evaporating heat exchanging unit which brings out the heat absorbing effect by evaporating the low-pressure refrigerant, the heat of the coolant is absorbed and hence the refrigerant is heated, so that the evaporation of the refrigerant is accelerated.

Next, the indoor air conditioning unit 30 will be described. The indoor air conditioning unit 30 is arranged inside of a dashboard panel (an instrument panel) in a foremost portion of the vehicle interior, and includes a blower 32, the above-described indoor condenser 12, the indoor evaporator 20 and the like accommodated in the casing 31 which forms an outer shell thereof.

The casing 31 forms the air passage of the vehicle-interior blown air which is blown into the vehicle interior, and is made of a resin (for example, polypropylene) having some degree of elasticity and being excellent in strength. An inside and outside air switching unit 33 configured to switch introduction of the vehicle interior air (inside air) and outside air is arranged on the upstream most side of the flow of the vehicle-interior blown air in the casing 31.

The inside and outside air switching unit 33 is provided with inside air inlet port for guiding the inside air into the interior of the casing 31 and the outside air inlet port for guiding the outside air therein. Furthermore, the inside and outside air switching unit 33 includes an inside and outside air switching door configured to adjust opening surface areas of the inside air inlet port and the outside air inlet port continuously to change a rate of air volume between an air volume of the inside air and an air volume of the outside air arranged in the interior thereof.

The blower 32 that blows the air sucked through the inside and outside air switching unit 33 toward the vehicle interior is arranged on a downstream side of the inside and outside air switching unit 33 in the direction of the air flow. The blower 32 is an electric blower that drives a centrifugal multiblade fan (sirocco fan) with an electric motor, and the number of rotations (blowing rate) of the blower 32 is controlled by a control voltage that is output from the air-conditioning control apparatus.

The indoor evaporator 20 and the indoor condenser 12 are arranged in this order with respect to the flow of vehicle-interior blown air on a downstream side of the blower 32 in the direction of the air flow. In other words, the indoor evaporator 20 is arranged on the upstream side of the indoor condenser 12 in the flowing direction of the vehicle-interior blown air.

An air mix door 34 that adjusts a rate of air volume that passes through the indoor condenser 12 in the blown air that has passed through the indoor evaporator 20 is arranged on a downstream side of the air flow of the indoor evaporator 20, and on the upstream side of the air flow of the indoor condenser 12. A mixing space 35 that mixes the blown air that has been heated by conducting heat exchange with the refrigerant in the indoor condenser 12 with the blown air that has not been heated while bypassing the indoor condenser 12 is provided on a downstream side of the air flow of the indoor condenser 12.

An outlet port for blowing out air conditioning wind mixed in the mixing space 35 into the vehicle interior, which is a space to be cooled, is arranged on the most downstream portion of the casing 31 in the direction of the air flow. Specifically, a face outlet port through which the air conditioning wind is blown out toward an upper body of an occupant present in the vehicle interior, a foot outlet port through which the air conditioning wind is blown out toward feet of the occupant, and a defroster outlet port through which the air conditioning wind is blown out toward an inner surface of a windshield of the vehicle (none of which is illustrated) are provided as this outlet port.

Therefore, the air mix door 34 adjusts the proportion of the air volume that passes through the indoor condenser 12 to adjust a temperature of the air conditioning wind mixed in the mixing space 35, and adjust the temperature of the air conditioning wind blown out from the respective outlet ports. In other words, the air mix door 34 constitutes a part of temperature adjusting means configured to adjust the temperature of the air conditioning wind that is blown into the vehicle interior.

In other words, the air mix door 34 functions as heat exchange amount adjusting means configured to adjust the heat exchange amount between the refrigerant discharged by the compressor 11 and the vehicle-interior blown air in the indoor condenser 12 which constitutes a part of a user-side heat exchanger. The air mix door 34 is driven by a servo motor, which is not illustrated, controlled in operation by the control signal output from the air-conditioning control apparatus.

Furthermore, face doors for adjusting the opening surface areas of the face outlet ports, foot doors for adjusting the opening surface areas of the foot outlet ports, and defroster doors for adjusting the opening surface areas of the defroster outlet ports (none of which are illustrated) are arranged on the upstream sides of the face outlet ports, the foot outlet ports, and the defroster outlet ports in the direction of the air flow, respectively.

The face door, the foot door, and the defroster door constitute a part of outlet port mode switching means configured to switch an outlet port mode, and are driven by a servo motor, which is not illustrated, controlled in operation by the control signal output from the air-conditioning control apparatus via a link mechanism or the like.

Next, a coolant circulation circuit 40 will be described. This coolant circulation circuit 40 is a coolant circulation circuit configured to circulate the coolant (for example, ethylene glycol aqueous solution) as a cooling medium (heat medium) in a coolant passage provided in the interior of the above-described traveling electric motor MG, which is one of vehicle-mounted devices associated with heat generation at the time of operation, to cool the traveling electric motor MG.

The coolant circulation circuit 40 includes, for example, a coolant pump 41, an electric three-direction valve 42, the radiator unit 43 of the combined heat exchanger 70, and a bypass passage 44 configured to flow the coolant so as to bypass the radiator unit 43 arranged therein.

The coolant pump 41 is an electric pump configured to pump the coolant into the coolant passage provided in the interior of the traveling electric motor MG in the coolant circulation circuit 40, and is controlled in number of rotations (flow rate) by the control signal output from the air-conditioning control apparatus. Therefore, the coolant pump 41 functions as cooling capacity adjusting means configured to adjust the cooling capacity by varying the flow rate of the coolant for cooling the traveling electric motor MG.

The three-direction valve 42 switches the coolant circuit between a coolant circuit that connects an inlet side of the coolant pump 41 and an outlet side of the radiator unit 43 to cause the coolant to flow into the radiator unit 43, and a coolant circuit that connects the inlet side of the coolant pump 41 and an outlet side of the bypass passage 44 to cause the coolant to flow while bypassing the radiator unit 43. The three-direction valve 42 is controlled in operation by a control voltage output from the air-conditioning control apparatus and constitutes a part of circuit switching means for the coolant circuit. The three-direction valve 42 also has a function as coolant inflow rate control means configured to control the inflow rate of the coolant into the radiator unit 43 by switching the coolant circuit.

In other words, in the coolant circulation circuit 40 of the present embodiment, as illustrated by broken line arrows in FIG. 1 and so forth, a coolant circuit that circulates the coolant in the order of the coolant pump 41 → the traveling electric motor MG → the radiator unit 43 → the coolant pump 41, and a coolant circuit that circulates the coolant in the order of the coolant pump 41 → the traveling electric motor MG → the bypass passage 44 → the coolant pump 41 may be switched.

Therefore, when the three-direction valve 42 switches the circuit to the coolant circuit in which the coolant bypasses the radiator unit 43 during an operation of the traveling electric motor MG, the coolant does not radiate heat in the radiator unit 43, and increases in temperature thereof. In other words, when the three-direction valve 42 switches the circuit to the coolant circuit in that the coolant bypasses the radiator unit 43, the heat of the traveling electric motor MG (amount of heat generation) is accumulated in the coolant.

In the coolant circulation circuit 40 of the present embodiment, the temperature of the coolant flowing out from the radiator unit 43 of the heat exchanger 70 is not higher than a predetermined reference temperature (not higher than 65° C. in the present embodiment). Accordingly, protection of an inverter of the traveling electric motor MG from a high heat is achieved.

The outdoor heat exchanging unit 16 is arranged in the engine room, and functions as the heat radiating heat exchanging unit which cause the coolant and the outside air blown from the blower fan 17 to exchange heat with each other. As described above, the radiator unit 43 constitutes a part of the combined heat exchanger 70 together with the outdoor heat exchanging unit 16.

Here, with reference to FIG. 4 to FIG. 9, a detailed configuration of the combined heat exchanger 70 of the present embodiment will be described. In FIG. 6, refrigerant tubes 16a are illustrated with dot hatching and a coolant tube 43a is illustrated with diagonal hatching for clarifying the drawing. In FIG. 9, a flow of a refrigerant in the heat pump cycle 10 is indicated by a solid line, and a flow of a coolant in the coolant circulation circuit 40 is indicated by broken line arrows.

Figure 4:
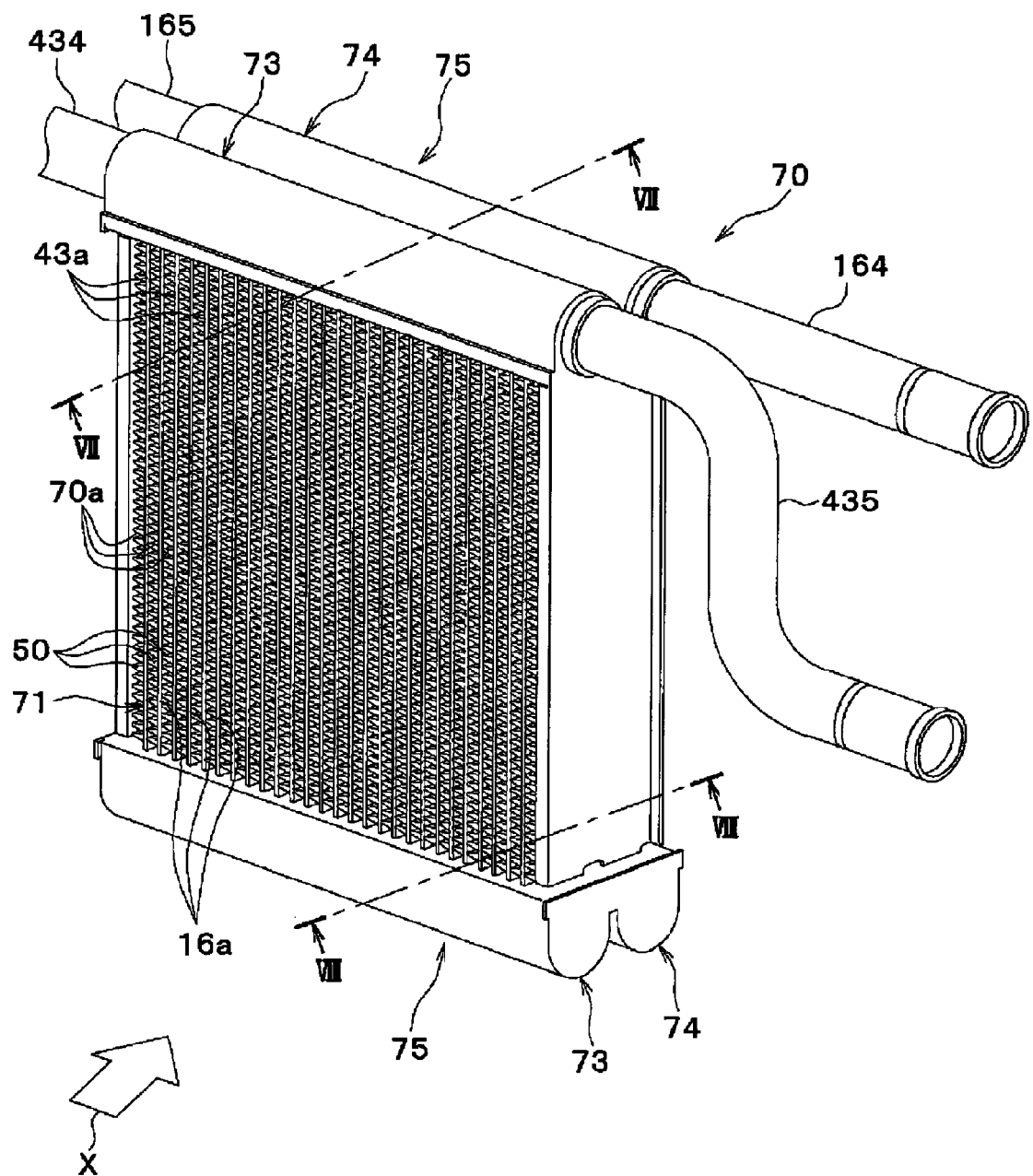
FIG. 4 is an appearance perspective view of a heat exchanger of the first embodiment.
Figure 5:
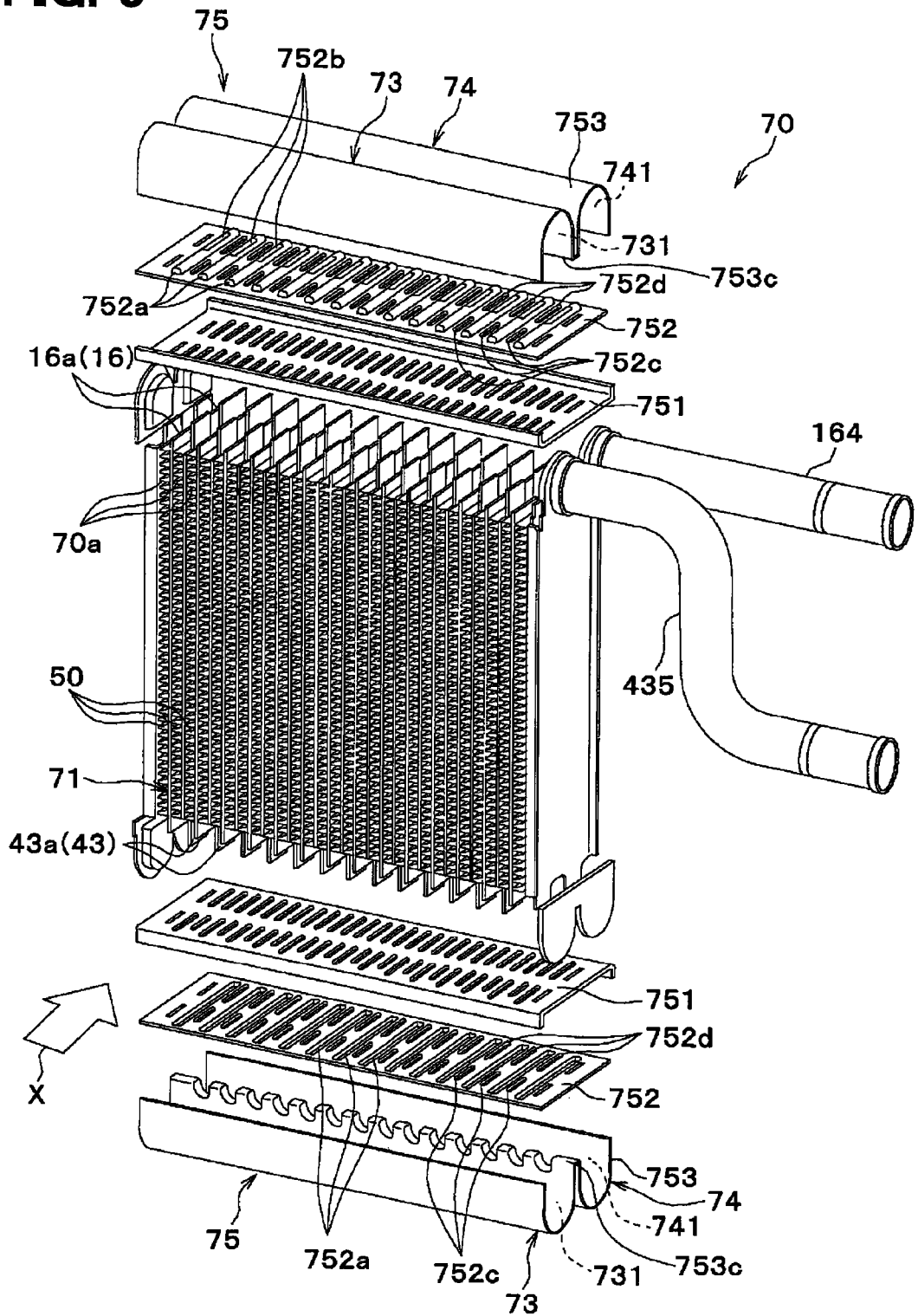
FIG. 5 is an exploded perspective view of the heat exchanger of the first embodiment.
Figure 6:
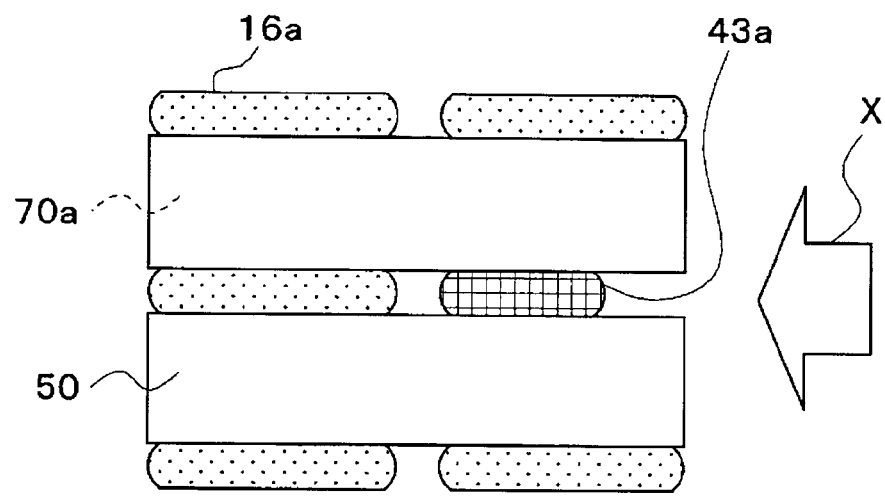
FIG. 6 is a schematic cross-sectional view of a heat exchanging unit of a heat exchanger of the first embodiment in a longitudinal direction.

First of all, as illustrated in FIG. 4 and FIG. 5, the combined heat exchanger 70 is configured as so-called a tank-and-tube-type heat exchanger having multiple tubes configured to flow the refrigerant or the coolant, respectively, and a pair of collection and distribution tanks arranged on both end sides of the plurality of tubes and configured to collect or distribute the refrigerant or the coolant flowing in the respective tubes.

More specifically, the combined heat exchanger 70 includes the refrigerant tubes 16a configured to allow the refrigerant as an example of a first fluid to flow therein and the coolant tubes 43a configured to allow the coolant as an example of a second fluid to flow therein in the interior thereof.

The combined heat exchanger 70 is provided with an upstream side heat exchanging unit 71 provided by arranging the refrigerant tubes 16a and the coolant tubes 43a alternately in a stacked manner. The upstream side heat exchanging unit 71 is a heat exchanging unit configured to cause the refrigerant that flows in the refrigerant tubes 16a and the air as an example of a third fluid flowing around the refrigerant tubes 16a (the outside air blown from the blower fan 17) to exchange heat with each other and the coolant flowing in the coolant tubes 43a and the air flowing around the coolant tubes 43a (the outside air blown from the blower fan 17) to exchange heat with each other.

A downstream side heat exchanging unit 72 including the refrigerant tubes 16a arranged in a stacked manner is provided on a downstream side in the direction of the outside air flow of the upstream side heat exchanging unit 71. The downstream side heat exchanging unit 72 is the heat exchanging unit configured to cause the refrigerant that flows in the refrigerant tubes 16a and the air flowing around the refrigerant tubes 16a (the outside air blown from the blower fan 17) to exchange heat with each other.

As the refrigerant tubes 16a and the coolant tubes 43a, flat tubes having a flat shape in a vertical cross section in a longitudinal direction are employed. More specifically, as the refrigerant tubes 16a, tubes having a flat porous cross section molded by an extrusion processing are employed. As the coolant tubes 43a, tubes having a flat cross section having two holes formed by bending a single plate material are employed.

The refrigerant tubes 16a and the coolant tubes 43a which constitute a part of the upstream side heat exchanging unit 71 are arranged alternately at a predetermined distance in a stacked manner with flat surfaces thereof out of outer surfaces in parallel to each other and so as to oppose each other. In the same manner, the refrigerant tubes 16a, which constitute a part of the downstream side heat exchanging unit 72, are also arranged in a stacked manner at a predetermined distance.

The refrigerant tubes 16a which constitute a part of the upstream side heat exchanging unit 71 are arranged between the coolant tubes 43a, and the coolant tubes 43a are arranged between the refrigerant tubes 16a. The refrigerant tubes 16a which constitute a part of the downstream side heat exchanging unit 72 and the refrigerant tubes 16a or the coolant tubes 43a which constitute a part of the upstream side heat exchanging unit 71 are arranged so as to overlap with each other in a flowing direction of the outside air blown by the blower fan 17.

In the heat exchanger 70, a space provided between the refrigerant tubes 16a and the coolant tubes 43a which constitute a part of the upstream side heat exchanging unit 71 and a space provided between the adjacent refrigerant tubes 16a which constitute a part of the downstream side heat exchanging unit 72 form an outside air passage 70a in which the outside air blown by the blower fan 17 flows. The outside air passage 70a may be used as an example of a third fluid passage in which the third fluid flows.

In the outside air passage 70a, outer fins 50 configured to accelerate the heat exchange between the refrigerant and the outside air and the heat exchange between the coolant and the outside air, and to allow heat transfer between the refrigerant that flows in the refrigerant tubes 16a which constitute a part of the upstream side heat exchanging unit 71 and the coolant flowing in the coolant tubes 43a and heat transfer of the refrigerants flowing in the adjacent refrigerant tubes 16a which constitute a part of the downstream side heat exchanging unit 72 are arranged.

As the outer fins 50, corrugate fins formed by bending a metallic thin plate having superior heat transfer properties into a wave shape are employed and, in the present embodiment, the outer fins 50 are joined to both of the refrigerant tubes 16a and the coolant tubes 43a which constitute a part of the upstream side heat exchanging unit 71, so that the heat transfer between the refrigerant tubes 16a and the coolant tubes 43a is enabled. Furthermore, the outer fins 50 are joined to the adjacent refrigerant tubes 16a which constitute a part of the downstream side heat exchanging unit 72, so that the heat transfer between the adjacent refrigerant tubes 16a is enabled. Surfaces of the outer fins 50 may be provided with multiple shutter-like louvers (which is not illustrated) provided along an outside air flowing direction X by cutting and rising.

Next, the refrigerant tubes 16a and coolant tubes 43a will be described with reference to FIG. 6. As illustrated in FIG. 6, the dimension (width) of the coolant tube 43a in the outside air flowing direction X is shorter than the dimension (width) of the refrigerant tubes 16a in the outside air flowing direction X. Therefore, the outer fins 50 are joined to both of the refrigerant tubes 16a and the coolant tube 43a, and an area of a joint surface between the refrigerant tube 16a and the outer fin 50 is different from an area of a joint surface between the coolant tubes 43a and the outer fin 50.

A most downstream portion of the outside air flow of the coolant tube 43a and the most downstream portion of the outside air flow of the refrigerant tubes 16a which constitute a part of the upstream side heat exchanging unit 71 are positioned on the same plane. The upstream most portion of the outside air flow of the coolant tube 43a is arranged on the downstream side of the upstream most portion of the outside air flow of the refrigerant tubes 16a which constitute a part of the upstream side heat exchanging unit 71 in the direction of the outside air flow. The upstream most portion of the outside air flow of the coolant tube 43a is arranged on the downstream side of the outer fins 50 in the direction of the outside air flow.

Next, upstream side tank units 73 and downstream side tank units 74 will be described. As illustrated in FIG. 4 and FIG. 5, the stacking-type heat exchanger 70 includes the upstream side tank units 73 extending in the stacking direction of the refrigerant tubes 16a and the coolant tubes 43a which constitute a part of the upstream side heat exchanging unit 71, and the downstream side tank units 74 extending in the stacking direction of the refrigerant tubes 16a which constitute a part of the downstream side heat exchanging unit 72.

Each of the upstream side tank units 73 is provided with an upstream side coolant space 731 configured to perform collection or distribution of the coolant flowing in the coolant tubes 43a which constitute a part of the upstream side heat exchanging unit 71 provided therein. Each of the downstream side tank units 74 is provided with a downstream side refrigerant space 741 configured to perform collection or distribution of the refrigerant tubes 16a which constitute a part of the downstream side heat exchanging unit 72 provided therein.

The upstream side tank unit 73 and the downstream side tank unit 74 are provided integrally. Hereinafter, a configuration in which the upstream side tank unit 73 and the downstream side tank unit 74 are combined into one unit is referred to as a header tank 75.

The header tank 75 includes a header plate 751 to which the refrigerant tubes 16a and the coolant tubes 43a arranged in two rows in the flowing direction of the outside air are both fixed, an intermediate plate member 752 fixed to the header plate 751, and a tank forming member 753.

The tank forming member 753 is fixed to the header plate 751 and the intermediate plate member 752 whereby the upstream side coolant space 731 and the downstream side refrigerant space 741 described above are provided in the interior thereof. Specifically, the tank forming member 753 is formed into a double-mountain shape (W-shape) when viewing from a longitudinal direction thereof by applying press work on a flat metal plate.

A double-mountain shaped center portion 753c of the tank forming member 753 is joined to the intermediate plate member 752, whereby the upstream side coolant space 731 and the downstream side refrigerant space 741 are partitioned.

Figure 7:
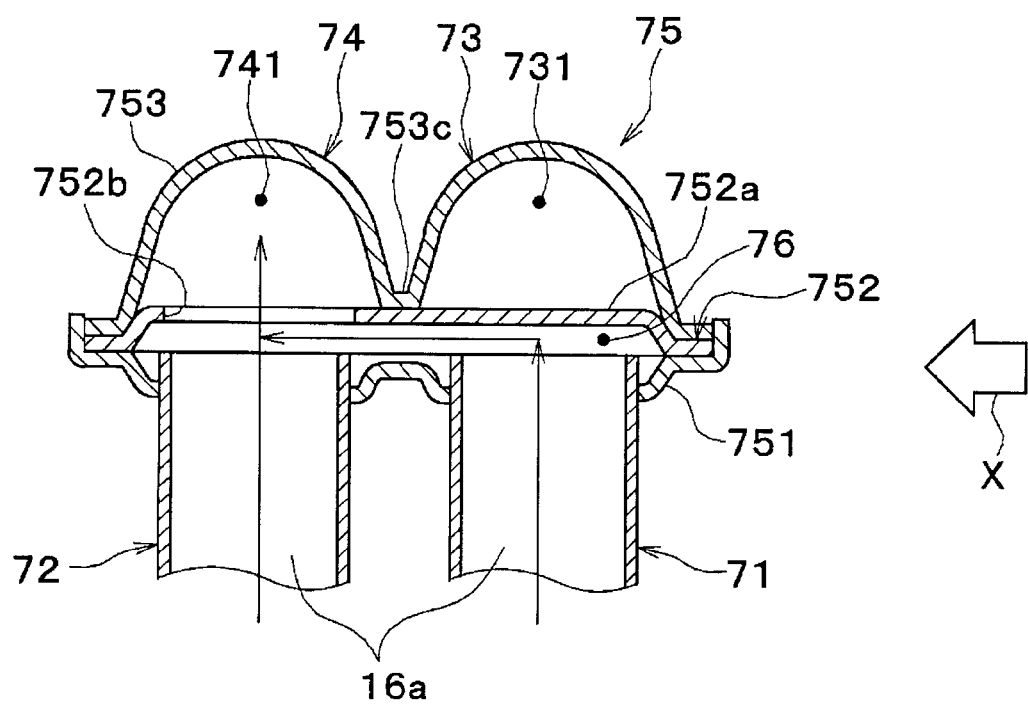
FIG. 7 is sectional view taken along a line VII-VII in FIG. 4.
Figure 8:
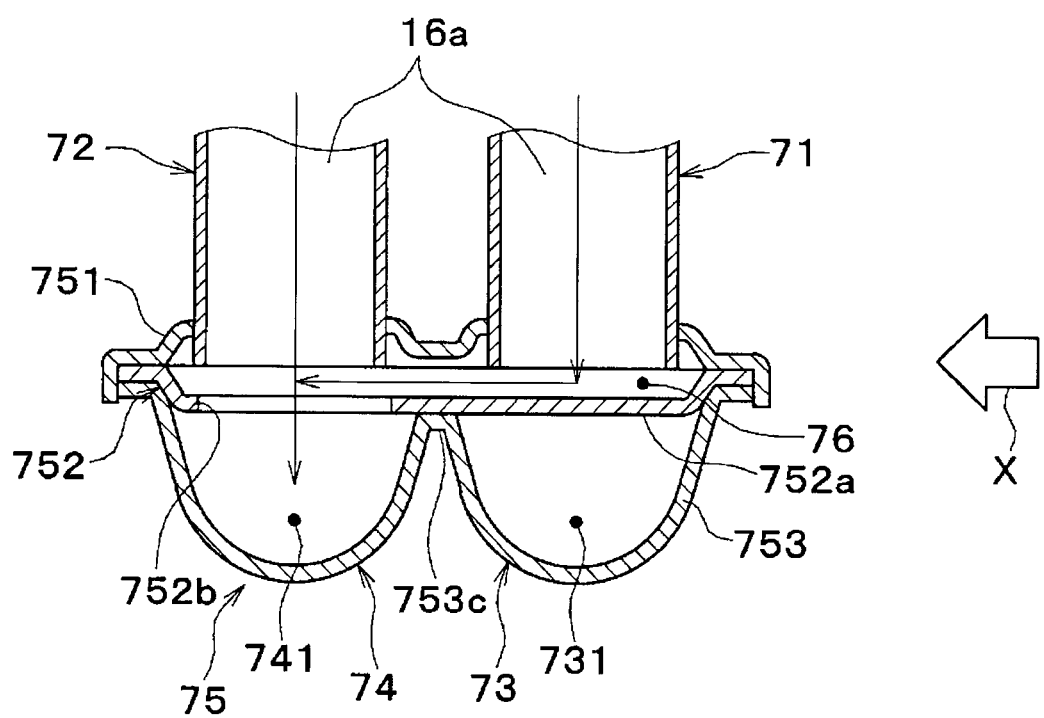
FIG. 8 is a sectional view taken along a line VIII-VIII of FIG. 4.
Figure 9:
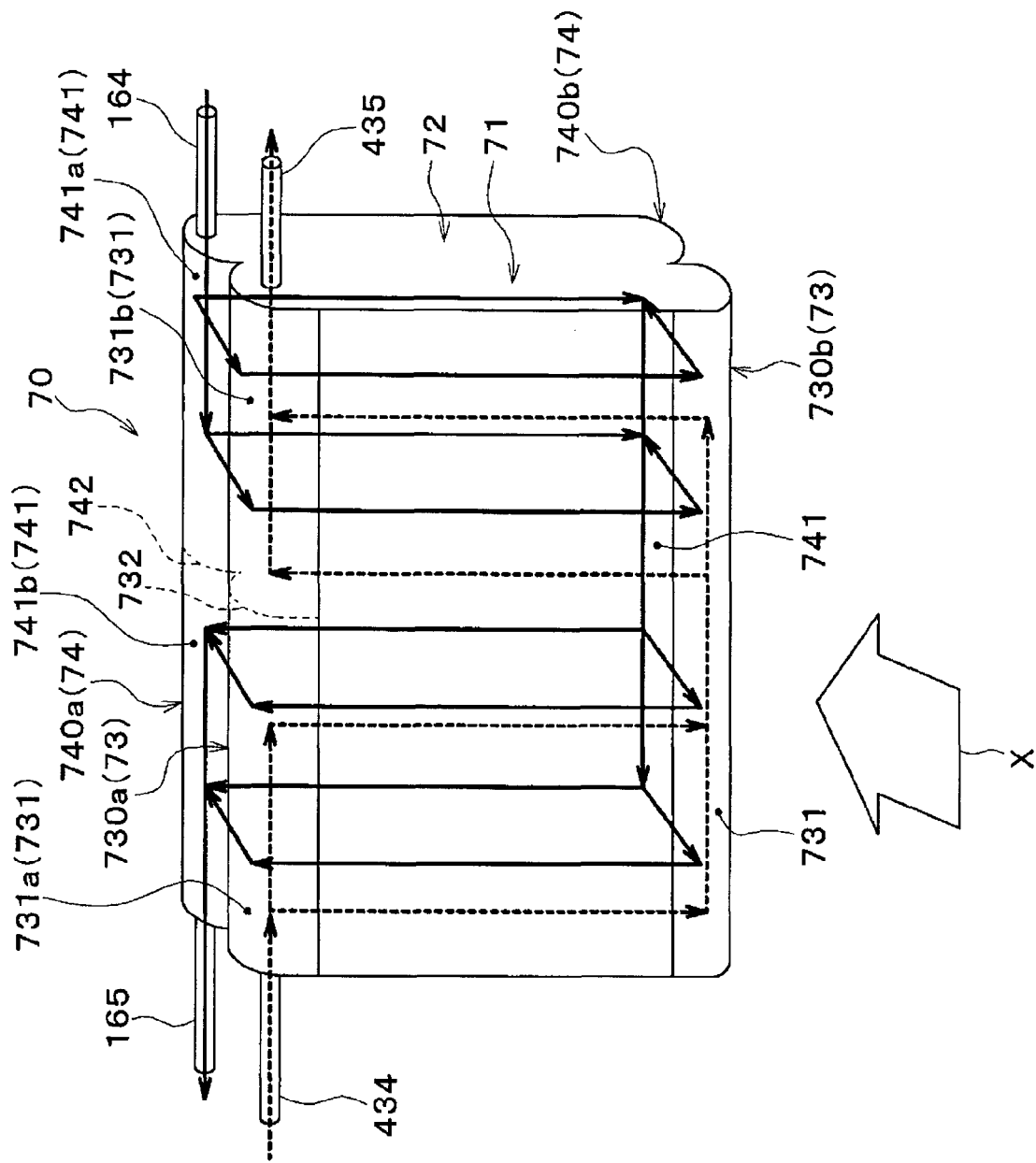
FIG. 9 is a schematic perspective view for explaining flows of a refrigerant and a coolant in the heat exchanger of the first embodiment.

The intermediate plate member 752 is provided with multiple depressed portions 752a that form multiple communicating spaces 76 communicating with the coolant tubes 43a provided between the intermediate plate member 752 and the header plate 751 by being fixed to the header plate 751 as illustrated in cross-sectional views in FIG. 7 and FIG. 8.

On the downstream side of the outside air flow in the depressed portions 752a, that is, in a portion corresponding to the downstream side refrigerant space 741 of each of the downstream side tank units 74, first through holes 752b penetrating therethrough from the front to the back thereof are provided. Accordingly the communicating spaces 76 and the downstream side refrigerant space 741 of each of the downstream side tank units 74 communicate with each other.

Therefore, the refrigerant flowed from the refrigerant tubes 16a which constitute a part of the upstream side heat exchanging unit 71 into the communicating spaces 76 flows out from the first through hole 752b to the downstream side refrigerant space 741. Therefore, the communicating spaces 76 have a function as communication paths configured to communicate the refrigerant tubes 16a which constitute a part of the upstream side heat exchanging unit 71 and the downstream side refrigerant space 741 of the downstream side tank units 74.

The communicating spaces 76 extend in a direction connecting ends of the refrigerant tubes 16a arranged so as to overlap with each other when viewing in the flowing direction of the outside air out of the refrigerant tubes 16a which constitute a part of the upstream side heat exchanging unit 71 and the refrigerant tubes 16a which constitute a part of the downstream side heat exchanging unit 72. More specifically, the communicating spaces 76 extend at the ends of the refrigerant tubes 16a which constitute a part of the upstream side heat exchanging unit 71 and of the refrigerant tubes 16a which constitute a part of the downstream side heat exchanging unit 72 in the flowing direction of the outside air.

At portions corresponding to the coolant tubes 43a which constitute a part of the upstream side heat exchanging unit 71 in the intermediate plate member 752, second through holes 752c penetrating therethrough from the front to the back thereof are provided. The coolant tubes 43a which constitute a part of the upstream side heat exchanging unit 71 penetrate through the second through holes 752c. Accordingly, the coolant tubes 43a which constitute a part of the upstream side heat exchanging unit 71 communicate with the upstream side coolant space 731 provided in the tank forming member 753.

Furthermore, as illustrated in FIG. 5, at ends of the upstream side heat exchanging unit 71 on the header tanks 75 side, the coolant tubes 43a project toward the header tanks 75 more than the refrigerant tubes 16a. In other words, the ends of the refrigerant tubes 16a on the header tanks 75 side and the ends of the coolant tubes 43a on the header tanks 75 side are arranged irregularly.

In contrast, at portions corresponding to the refrigerant tubes 16a which do not communicate with the communicating spaces 76 out of the refrigerant tubes 16a which constitute a part of the downstream side heat exchanging unit 72 in the intermediate plate member 752, third through holes 752d penetrating therethrough from the front to the back thereof are provided. The refrigerant tubes 16a which do not communicate with the communicating spaces 76 out of the refrigerant tubes 16a which constitute a part of the downstream side heat exchanging unit 72 penetrates through the third through holes 752d. Accordingly, the refrigerant tubes 16a which do not communicate with the communicating spaces 76 out of the refrigerant tubes 16a which constitute a part of the downstream side heat exchanging unit 72 communicate with the downstream side refrigerant space 741 provided in the tank forming member 753.

Furthermore, as illustrated in FIG. 5, at ends of the downstream side heat exchanging unit 72 on the header tanks 75 side, the refrigerant tubes 16a which do not communicate with the communicating spaces 76 project toward the header tanks 75 more than the refrigerant tubes 16a which communicate with the communicating spaces 76. In other words, the ends of the adjacent refrigerant tubes 16a are arranged irregularly.

The center portion 753c of each of the tank forming members 753 is formed into a shape matching the depressed portions 752a provided on the intermediate plate member 752 and the upstream side coolant space 731 and the downstream side refrigerant space 741 are partitioned so as to avoid the coolant or the refrigerant in the interior thereof from leaking from joint portions between the header plate 751 and the intermediate plate member 752.

As illustrated in FIG. 4, a coolant inflow pipe 434 configured to allow the coolant to flow into the upstream side coolant space 731 is connected to one end side in a longitudinal direction of the upstream side tank units 73 arranged on one end side in the longitudinal direction (the left side of the paper plane of the drawing) of the coolant tubes 43a (the upper side of the paper plane of the drawing). A coolant outflow pipe 435 configured to flow out coolant from the upstream side coolant space 731 is connected to the other end side in the longitudinal direction of the upstream side tank units 73 arranged on one end side in the longitudinal direction (the right side of the paper plane of the drawing) of the coolant tubes 43a. Both end sides of the upstream side tank unit 73 arranged on the other end side (the lower side of the paper plane of the drawing) of the coolant tube 43a in the longitudinal direction are closed by the closing members.

A refrigerant outflow pipe 165 configured to flow out the refrigerant from the downstream side refrigerant space 741 is connected to one end side in the longitudinal direction of the downstream side tank units 74 arranged on one end side (the left side of the paper plane of the drawing) in the longitudinal direction of the refrigerant tubes 16a (the upper side of the paper plane of the drawing). A refrigerant inflow pipe 164 configured to flow the refrigerant to the downstream side refrigerant space 741 is connected to the other end side in the longitudinal direction of the downstream side tank units 74 arranged on the one end side in the longitudinal direction (the right side of the paper plane of the drawing) of the refrigerant tubes 16a. Both ends of the downstream side tank unit 74 arranged on the other end side of the refrigerant tubes 16a in the longitudinal direction (the lower side of the paper plane of the drawing) are closed by the closing members.

As illustrated in FIG. 9, an upstream side partitioning member 732 configured to partition the upstream side coolant space 731 into two parts in a longitudinal direction of a first upstream side tank unit 730a is arranged on the upstream side tank units 73 arranged on one end side in the longitudinal direction of the coolant tubes 43a (the upper side of the paper plane of FIG. 4) (hereinafter referred to as the first upstream side tank unit 730a).

Out of two upstream side coolant spaces 731 partitioned by the upstream side partitioning member 732, the space which communicates with the coolant inflow pipe 434 is referred to as a first upstream side coolant space 731a, and the space which communicates with the coolant outflow pipe 435 is referred to as a second upstream side coolant space 731b. The upstream side tank unit 73 arranged on the other end side (the lower side of the paper plane of FIG. 4) of the coolant tubes 43a in the longitudinal direction is referred to as a second upstream side tank unit 730b.

In contrast, a downstream side partitioning member 742 configured to partition the downstream side refrigerant space 741 into two parts in the longitudinal direction of a first downstream side tank unit 740a is arranged in the downstream side tank unit 74 arranged on one end side in the longitudinal direction of the refrigerant tubes 16a (the upper side of the paper plane of FIG. 4) (hereinafter referred to as the first downstream side tank unit 740a).

Out of the two parts of the downstream side refrigerant spaces 741 partitioned by the downstream side partitioning member 742, the space which communicates with the refrigerant inflow pipe 164 is referred to as a first downstream side refrigerant space 741a, and a space which communicates with the refrigerant outflow pipe 165 is referred to as a second downstream side refrigerant space 741b. The downstream side tank unit 74 arranged on the other end side (the lower side of the paper plane of FIG. 4) of the refrigerant tubes 16a in the longitudinal direction is referred to as a second downstream side tank unit 740b.

Therefore, in the heat exchanger 70 of the present embodiment, as illustrated in a schematic perspective view of FIG. 9, a part of the refrigerant that flows into the first downstream side refrigerant space 741a of the first downstream side tank unit 740a via the refrigerant inflow pipe 164 flows into the refrigerant tubes 16a which constitute a part of the downstream side heat exchanging unit 72, and flows from the upper side toward the lower side of the drawing in the refrigerant tubes 16a. Another part of the refrigerant that has flowed in the first downstream side refrigerant space 741a of the first downstream side tank unit 740a flows into the refrigerant tubes 16a which constitute a part of the upstream side heat exchanging unit 71, and flows from the upper side toward the lower side of the drawing in the refrigerant tubes 16a via the communicating spaces 76 provided between the header plate 751 and the intermediate plate member 752.

The refrigerant that has flowed out from the refrigerant tubes 16a which constitute a part of the downstream side heat exchanging unit 72 is collected in the downstream side refrigerant space 741 of the second downstream side tank unit 740b. The refrigerant that has flowed out from the refrigerant tubes 16a which constitute a part of the upstream side heat exchanging unit 71 is collected in the downstream side refrigerant space 741 of the second downstream side tank unit 740b via the communicating spaces 76 provided between the header plate 751 and the intermediate plate member 752.

The refrigerant collected in the downstream side refrigerant space 741 of the second downstream side tank unit 740b flows from the right side toward the left side of the drawing. Subsequently, a part of the refrigerant collected in the downstream side refrigerant space 741 of the second downstream side tank unit 740b flows into the refrigerant tubes 16a which constitute a part of the downstream side heat exchanging unit 72, and flows from the lower side toward the upper side of the drawing in the refrigerant tubes 16a. Another part of the refrigerant collected in the downstream side refrigerant space 741 of the second downstream side tank unit 740b flows into the refrigerant tubes 16a which constitute a part of the upstream side heat exchanging unit 71, and flows from the lower side toward the upper side of the drawing in the refrigerant tubes 16a via the communicating spaces 76 provided between the header plate 751 and the intermediate plate member 752.

The refrigerant that has flowed out from the refrigerant tubes 16a which constitute a part of the downstream side heat exchanging unit 72 is collected in the second downstream side refrigerant space 741b of the first downstream side tank unit 740a. The refrigerant that has flowed out from the refrigerant tubes 16a which constitute a part of the upstream side heat exchanging unit 71 is collected in the second downstream side refrigerant space 741b of the first downstream side tank unit 740a via the communicating spaces 76 provided between the header plate 751 and the intermediate plate member 752.

The refrigerant collected in the second downstream side refrigerant space 741b of the first downstream side tank unit 740a flows from the right side toward the left side of the drawing, and flows out from the refrigerant outflow pipe 165.

In contrast, in the heat exchanger 70 of the present embodiment, as illustrated in the schematic perspective view of FIG. 9, the coolant that has flowed into the first upstream side coolant space 731a of the first upstream side tank unit 730a via the coolant inflow pipe 434 flows into the coolant tubes 43a which constitute a part of the upstream side heat exchanging unit 71, and flows from the upper side toward the lower side of the drawing in the coolant tubes 43a.

The coolant that has flowed out from the coolant tubes 43a which constitute a part of the upstream side heat exchanging unit 71 is collected in the upstream side coolant space 731 of the second upstream side tank unit 730b. The coolant collected in the upstream side coolant space 731 of the second upstream side tank unit 730b flows from the left side toward the right side of the drawing.

Subsequently, the coolant collected in the upstream side coolant space 731 of the second upstream side tank unit 730b flows into the coolant tubes 43a which constitute a part of the upstream side heat exchanging unit 71, and flows from the lower side toward the upper side of the drawing in the coolant tubes 43a. The coolant that has flowed out from the coolant tubes 43a which constitute a part of the upstream side heat exchanging unit 71 is collected in the second upstream side coolant space 731b of the first upstream side tank unit 730a.

The coolant collected in the second upstream side coolant space 731b of the first upstream side tank unit 730a flows from the left side toward the right side of the drawing, and flows out from the coolant outflow pipe 435.

In the heat exchanger 70 described above, the outdoor heat exchanging unit 16 includes both of the refrigerant tubes 16a which constitute a part of the upstream side heat exchanging unit 71 and the refrigerant tubes 16a which constitute a part of the downstream side heat exchanging unit 72, and the radiator unit 43 includes the coolant tubes 43a which constitute a part of the upstream side heat exchanging unit 71.

The respective components such as the refrigerant tubes 16a of the heat exchanger 70, the coolant tubes 43a, and the header tank 75, and the outer fins 50 described above are all formed of the same metallic material (aluminum alloy in the present embodiment). The header plate 751 and the tank forming member 753 are fixed by caulking in a state in which the intermediate plate member 752 is interposed therebetween.

In addition, the heat exchanger 70 in a state of being fixed by caulking is loaded entirely into a heating furnace and is heated, a brazing filler metal in which surfaces of the respective components are clad in advance is fused, and then is cooled until the brazing filler metal is solidified again, so that the respective components are integrally brazed. Accordingly, the outdoor heat exchanging unit 16 and the radiator unit 43 are combined into one unit.

As is apparent from the description given above, the refrigerant of the present embodiment may correspond to the first fluid, the coolant may correspond to the second fluid, the air (outside air) may correspond to the third fluid, the refrigerant tube 16a may correspond to a first tube in which the first fluid flows, and the coolant tubes 43a may correspond to a second tube in which the second fluid flows.

Next, an electric control unit of the present embodiment will be described. The air-conditioning control apparatus includes a known microcomputer including a CPU, a ROM, and a RAM, and peripheral circuits thereof, and is configured to perform various computations and processes on the basis of an air conditioning control program memorized in the ROM, and control operations of the various air conditioning control equipment 11, 15a, 15b, 17, 41, 42 connected to an output side thereof.

Also, a various air conditioning control sensor set including an inside air-temperature sensor configured to detect a vehicle interior temperature, an outside air sensor configured to detect an outside air temperature, a solar radiation sensor configured to detect an amount of solar radiation in the vehicle interior, an evaporator-temperature sensor configured to detect a blown out air temperature of the indoor evaporator 20 (the temperature of the evaporator), a discharged refrigerant temperature sensor configured to detect a discharged refrigerant temperature from the compressor 11, an outlet refrigerant temperature sensor 51 configured to detect an outlet side refrigerant temperature Te of the outdoor heat exchanging unit 16, and a coolant temperature sensor 52 as coolant temperature detecting means configured to detect a coolant temperature Tw of the coolant flowing into the traveling electric motor MG is connected to an input side of the air-conditioning control apparatus.

In the present embodiment, the coolant temperature Tw of the coolant pumped from the coolant pump 41 is detected by the coolant temperature sensor 52. However, the coolant temperature Tw of the coolant sucked by the coolant pump 41 may be detected as a matter of course.

Furthermore, an operation panel, which is not illustrated, which is arranged near a dashboard panel positioned at a front portion in the vehicle interior, is connected to the input side of the air-conditioning control apparatus, so that operation signals output from various air conditioning operation switches mounted on the operation panel are input. An operation switch of the vehicle air conditioning apparatus, a vehicle interior temperature setting switch configured to set the vehicle interior temperature, an operation mode selecting switch and the like are provided as the various air conditioning operation switches that are mounted on the operation panel.

The air-conditioning control apparatus includes the electric motor 11b of the compressor 11 and control means configured to control the opening-and-closing valve 15a integrally, and is configured to control the operations of these members. However, in the present embodiment, in the air-conditioning control apparatus, a configuration for controlling the operation of the compressor 11 (hardware and software) constitute a part of refrigerant discharging capacity control means, and a configuration for controlling the operations of various devices 15a, 15b which constitute parts of the refrigerant flow channel switching means constitute parts of the refrigerant flow channel control means, and a configuration for controlling the operation of the three-direction valve 42 which constitute a part of the circuit switching means for the coolant constitutes a part of coolant circuit control means.

In addition, the air-conditioning control apparatus of the present embodiment has a configuration (frost formation determining means) that determines whether or not frost formation occurs in the outdoor heat exchanging unit 16 on the basis of a detection signal from the air conditioning control sensor set described above. Specifically, in the frost formation determining means of the present embodiment, it is determined that the frost formation occurs in the outdoor heat exchanging unit 16 when the vehicle speed of the vehicle is not higher than a predetermined reference vehicle speed (20 km/h in the present embodiment) and the outlet side refrigerant temperature Te of the outdoor heat exchanging unit 16 is not higher than 0° C.

Next, an operation of the vehicle air conditioning apparatus 1 of the present embodiment having the configuration described above will be descried. The vehicle air conditioning apparatus 1 of the present embodiment is capable of executing the heating operation for heating the vehicle interior and the cooling operation for cooling the vehicle interior, as well as the defrosting operation at the time of the heating operation. Next, the operation of the above-mentioned operations will be described.

(a) Heating Operation

The heating operation starts when a heating operation mode is selected by a select switch in a state in which an operation switch of the operation panel turns on. When it is determined that frost formation occurs in the outdoor heat exchanging unit 16 by frost formation determining means at the time of the heating operation, the defrosting operation is executed.

First of all, in the normal heating operation, the air-conditioning control apparatus closes the opening-and-closing valve 15a, switches the three-direction valve 15b to the refrigerant flow channel that connects the outlet side of the outdoor heat exchanging unit 16 and the inlet side of the accumulator 18 and further activates the coolant pump 41 to pump a predetermined flow rate of the coolant, and switches the circuit to the coolant circuit in which the coolant flows through the three-direction valve 42 of the coolant circulation circuit 40 while bypassing the radiator unit 43.

Accordingly, the heat pump cycle 10 is switched to the refrigerant flow channel in which the refrigerant flows as indicated by solid line arrows in FIG. 1, and the coolant circulation circuit 40 is switched to the coolant circuit in which the coolant flows as indicated by broken line arrows in FIG. 1.

In the configurations of the refrigerant flow channel and the coolant circuit, the air-conditioning control apparatus reads the detection signals from the above-described air conditioning control sensor set, and the operation signals of the operation panel. Subsequently, a target blowout temperature TAO that is a target temperature of the air that is blown out into the vehicle interior is calculated on the basis of values of the detection signals and the operation signals.

Furthermore, the air conditioning control device determines operating states of the various air-conditioning control devices connected to the output side of the air-conditioning control apparatus on the basis of the calculated target blowout temperature TAO and the detection signals from the sensor set.

For example, the refrigerant discharging capacity of the compressor 11, that is, a control signal to be output to the electric motor of the compressor 11 is determined as described below. First, a target evaporator blowout temperature TEO of the indoor evaporator 20 is determined on the basis of the target blowout temperature TAO with reference to a control map that is memorized in the air-conditioning control apparatus in advance.

Subsequently, the control signal to be output to the electric motor of the compressor 11 is determined by using a feedback control method on the basis of a deviation between the target evaporator blowout temperature TEO and an blown out air temperature from the indoor evaporator 20 detected by an evaporator temperature sensor, so that the blown out air temperature from the indoor evaporator 20 gets closer to the target evaporator blowout temperature TEO.

A control signal output to the servo motor of the air mix door 34 is determined by using the target blowout temperature TAO, the blown out air temperature from the indoor evaporator 20, and the temperature of refrigerant discharged from the compressor 11 detected by a discharged refrigerant temperature sensor and the like, so that the temperature of the air blown into the vehicle interior becomes an occupant-desired temperature set by a vehicle interior temperature setting switch.

At the time of the normal heating operation and the defrosting operation, the opening degree of the air mix door 34 may be controlled so that the total air volume of the vehicle-interior blown air blown from the blower 32 passes through the indoor condenser 12.

The control signals and the like determined as described above are output to various air-conditioning control devices. After that, until the stop of the operation of the vehicle air conditioning apparatus is required by the operation panel, a control routine, which includes the reading of the above-mentioned detection signals and the above-mentioned operation signals, the calculation of the target blowout temperature TAO, the determination of the operating states of the various air-conditioning control devices, and the output of the control voltages and the control signals, is repeated every predetermined control period.

Meanwhile, the repetition of such a control routine is also performed basically in the same manner at the time of other operations.

In the heat pump cycle 10 at the time of the normal heating operation, the high-pressure refrigerant discharged from the compressor 11 flows into the indoor condenser 12. The refrigerant that flows into the indoor condenser 12 radiates heat by exchanging heat between itself and the vehicle-interior blown air that has been blown from the blower 32 and passed through the indoor evaporator 20. Accordingly, the vehicle-interior blown air is heated.

The high-pressure refrigerant that has flowed out from the indoor condenser 12 flows into the heating fixed throttle 13 and is decompressed and expanded since the opening-and-closing valve 15a is closed. The low-pressure refrigerant decompressed and expanded by the heating fixed throttle 13 flows into the outdoor heat exchanging unit 16. The low-pressure refrigerant that has flowed into the outdoor heat exchanging unit 16 absorbs heat from the outside air blown by the blower fan 17, and then evaporates.

At this time, in the coolant circulation circuit 40, since the circuit is switched to the coolant circuit in which the coolant flows while bypassing the radiator unit 43, the coolant is prevented from radiating heat to the refrigerant that flows in the outdoor heat exchanging unit 16 and the coolant is prevented from absorbing heat from the refrigerant that flows in the outdoor heat exchanging unit 16. In other words, the refrigerant that flows in the outdoor heat exchanging unit 16 is not thermally influenced by the coolant.

The refrigerant that has flowed out from the outdoor heat exchanging unit 16 flows into the accumulator 18 and is separated into gas and liquid since the three-direction valve 15b is switched to the refrigerant flow channel which connects the outlet side of the outdoor heat exchanging unit 16 and the inlet side of the accumulator 18. A gas-phase refrigerant that has been separated by the accumulator 18 is absorbed by the compressor 11, and again compressed.

As described thus far, at the normal heating operation, the vehicle-interior blown air is heated by the heat of the refrigerant discharged from the compressor 11 by the indoor condenser 12, so that the vehicle interior may be heated.

(b) Defrosting Operation

Next, the defrosting operation will be described. In a refrigeration cycle device configured to cause the refrigerant and the outside air to exchange heat in the outdoor heat exchanging unit 16 to evaporate the refrigerant as the heat pump cycle 10 of the present embodiment, when the refrigerant evaporation temperature in the outdoor heat exchanging unit 16 is decreased to the frost formation temperature (0° C., specifically) or below, the frost formation may occur in the outdoor heat exchanging unit 16.

When such frost formation occurs, the outside air passage 70a of the heat exchanger 70 is clogged by the frost, so that the heat exchange performance of the outdoor heat exchanging unit 16 is significantly lowered. Therefore, in the heat pump cycle 10 of the present embodiment, when the frost formation determining means determines that frost formation occurs in the outdoor heat exchanging unit 16 at the time of the heating operation, the defrosting operation is executed.

In this defrosting operation, the air-conditioning control apparatus stops the operation of the compressor 11, and stops the operation of the blower fan 17. Therefore, at the time of the defrosting operation, the refrigerant flow rate flowing into the outdoor heat exchanging unit 16 is reduced and the outside air volume flowing into the outside air passage 70a is reduced with respect to the normal heating operation.

In addition, the air-conditioning control apparatus switches the three-direction valve 42 of the coolant circulation circuit 40 to the coolant circuit which allows the coolant to flow into the radiator unit 43 as indicated by broken line arrows in FIG. 2. Accordingly, the refrigerant does not circulate in the heat pump cycle 10, and the coolant circulation circuit 40 is switched to the coolant circuit in which the refrigerant flows as indicated by broken line arrows in FIG. 2.

Therefore, the heat of the coolant flowing in the coolant tubes 43a of the radiator unit 43 is transferred to the outdoor heat exchanging unit 16 via the outer fins 50, and thereby the outdoor heat exchanging unit 16 is defrosted. In other words, defrosting which utilizes waste heat of the traveling electric motor MG effectively is achieved.

(c) Cooling Operation

The cooling operation starts when the cooling operation mode is selected by the select switch in the state in which the operation switch of the operation panel turns on. At the time of the cooling operation, the air-conditioning control apparatus opens the opening-and-closing valve 15a, and switches the three-direction valve 15b to the refrigerant flow channel that connects the outlet side of the outdoor heat exchanging unit 16 and the inlet side of the cooling fixed throttle 19. Accordingly, the heat pump cycle 10 is switched to the refrigerant flow channel in which the refrigerant flows as indicated by solid line arrows in FIG. 3.

At this time, the three-direction valve 42 of the coolant circulation circuit 40 is switched to the coolant circuit which allows the coolant to flow into the radiator unit 43 when the coolant temperature Tw is increased to a reference temperature or higher, and is switched to the coolant circuit which allows the coolant to flow while bypassing the radiator unit 43 when the coolant temperature Tw is lowered to less than the predetermined reference temperature. In FIG. 3, a flow of the coolant when the coolant temperature Tw is increased to the reference temperature or higher is indicated by broken line arrows.

In the heat pump cycle 10 at the time of the cooling operation, the high-pressure refrigerant discharged from the compressor 11 flows into the indoor condenser 12 and exchanges heat with the vehicle-interior blown air blown from the blower 32 and passed through the indoor evaporator 20 to radiate heat. The high-pressure refrigerant that has flowed out from the indoor condenser 12 flows into the outdoor heat exchanging unit 16 via the fixed throttle bypassing passage 14 since the opening-and-closing valve 15a is opened. The low-pressure refrigerant that has flowed into the outdoor heat exchanging unit 16 further radiates heat to the outside air blown by the blower fan 17.

The refrigerant that has flowed out from the outdoor heat exchanging unit 16 is decompressed and expanded by the cooling fixed throttle 19 since the three-direction valve 15b is switched to the refrigerant flow channel which connects the outlet side of the outdoor heat exchanging unit 16 and the inlet side of the cooling fixed throttle 19. The refrigerant that has flowed out from the cooling fixed throttle 19 flows into the indoor evaporator 20, and absorbs heat from the vehicle-interior blown air blown by the blower 32 to evaporate. Accordingly, the vehicle-interior blown air is cooled.

The refrigerant that has flowed out from the indoor evaporator 20 flows into the accumulator 18 and is separated into gas and liquid. A gas-phase refrigerant that has been separated by the accumulator 18 is absorbed by the compressor 11, and again compressed. As described thus far, at the time of the cooling operation, the vehicle-interior blown air is cooled by the low-pressure refrigerant absorbing heat from the vehicle-interior blown air to evaporate by the indoor evaporator 20, so that the vehicle-interior blown air may be cooled, so that the vehicle interior may be cooled.

In the vehicle air conditioning apparatus 1 of the present embodiment, various operations can be executed by switching the refrigerant flow channel of the heat pump cycle 10 and the coolant circuit of the coolant circulation circuit 40 as described above. Furthermore, in the present embodiment, since the characteristic heat exchanger 70 described above is employed, the heat exchange amounts among three types of fluid, namely, the refrigerant, the coolant, and the outside air may be finely adjusted.

More specifically, in the heat exchanger 70 of the present embodiment, the outer fins 50 which are joined to both of the refrigerant tubes 16a and the coolant tubes 43a have different joint surface areas for the refrigerant tubes 16a and for the coolant tubes 43a.

Specifically, the dimension of the coolant tubes 43a in the outside air flowing direction X is shorter than the dimension of the refrigerant tubes 16a in the outside air flowing direction X.

In addition, the upstream most portions of the outside air flow of the coolant tubes 43a are arranged on the downstream side of the upstream most portion of the outside air flow of the refrigerant tubes 16a which constitute a part of the upstream side heat exchanging unit 71 in the direction of the outside air flow. Accordingly, the heat exchange amount between the refrigerant and the outside air is sufficiently secured. Therefore, the heat exchange amount of the refrigerant and the outside air may be adequately secured as the entire heat exchanger 70.

The arrangement of the coolant tubes 43a of the present embodiment is an example only, and the temperature difference between the coolant and the outside air may be changed by varying the arrangement of the coolant tubes 43a in the outside air flowing direction X, so that the heat exchange amount between the coolant and the outside air may be finely adjusted. In other words, the more upstream the position of arrangement of the coolant tubes 43a in the direction of the flow of the outside air, the more the heat exchange amount between the coolant and the outside air is increased, and the more downstream the position of arrangement of the coolant tubes 43a is, the more the heat exchange amount between the coolant and the outside air is decreased.

When the evaporation temperature of the refrigerant in the outdoor heat exchanging unit 16 is lowered to a temperature not higher than a frost formation temperature, the frost formation may occur in the outdoor heat exchanging unit 16. When such a frost formation occurs, the outside air passage 70a of the heat exchanger 70 is clogged by the frost.

In contrast, in the present embodiment, the upstream most portions of the coolant tubes 43a in the direction of the outside air flow are arranged on the downstream side of both of the upstream most portion of the refrigerant tubes 16a which constitute a part of the upstream side heat exchanging unit 71 and the upstream most portion of the outer fins 50 in the direction of the outside air flow. Therefore, even though the upstream most portion of the portion where the outer fins 50 are arranged (the outside air passage 70a) in the direction of the outside air flow is clogged by frost, air may be introduced from side portions of the outer fins 50 in the vicinity of the upstream most portion of the outside air flow of the coolant tube 43a. Accordingly, the clogging of the outside air passage 70a due to the frost formation is restricted, and hence frost formation resistance properties may be improved.

The coolant tubes 43a, configured to allow the coolant of the engine to flow therein, are components of a traveling system of the vehicle. Therefore, in comparison with the refrigerant tubes 16a as a component of a non-traveling system, resistance for collisional destruction needs to be improved.

In the present embodiment, the upstream most portions of the outside air flow of the coolant tubes 43a are arranged on the downstream side in the direction of the outside air flow than the upstream most portion of the outside air flow of the refrigerant tubes 16a which constitute a part of the upstream side heat exchanging unit 71. Therefore, the refrigerant tubes 16a receive an impact of a collision from the front of the vehicle before the coolant tubes 43a, so that protection of the coolant tubes 43a from the impact of the collision is achieved.

In the same manner, protection of the coolant tubes 43a from pitching stone or the like at the time of traveling is also achieved.

Second Embodiment

Figure 10:
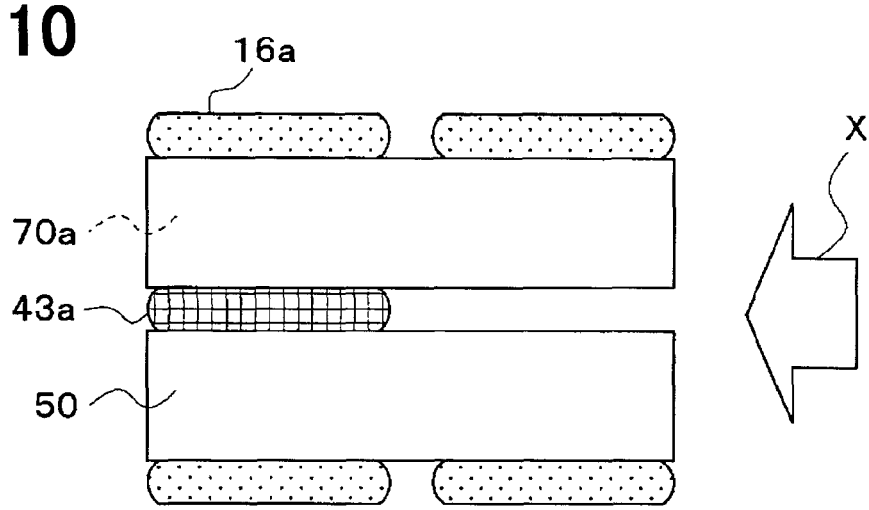
FIG. 10 is a schematic cross-sectional view of a heat exchanging unit of a heat exchanger of a second embodiment of the present disclosure in the longitudinal direction.

Next, a second embodiment of the present disclosure will be described with reference to FIG. 10. The second embodiment is different from the first embodiment in configuration of refrigerant tubes 16a and coolant tubes 43a. FIG. 10 is a drawing corresponding to FIG. 6 of the first embodiment.

As illustrated in FIG. 10, the upstream side heat exchanging unit 71 of the present embodiment includes the refrigerant tubes 16a arranged in a stacked manner. The downstream side heat exchanging unit 72 of the present embodiment includes the refrigerant tubes 16a and the coolant tube 43a arranged alternately in a stacked manner. In the outside air flowing direction X, neither the refrigerant tubes 16a nor the coolant tube 43a is arranged at a portion overlapped with the coolant tubes 43a which constitute parts of the downstream side heat exchanging unit 72.

In other words, in the present embodiment, two of the refrigerant tubes 16a are arranged in parallel in the outside air flowing direction X, while the coolant tube 43a is arranged solely in the outside air flowing direction X. Therefore, the number of arrays of the refrigerant tubes 16a in the outside air flowing direction X and the number of arrays of the coolant tube 43a in the outside air flowing direction X joined to a single outer fin 50 are different In the present embodiment, the tubes having the same contour are employed as the refrigerant tubes 16a and the coolant tube 43a. The most downstream portion of the outside air flow of the coolant tube 43a and the most downstream portion of the outside air flow of the refrigerant tubes 16a which constitute a part of the downstream side heat exchanging unit 72 are positioned on the same plane. The upstream most portion of the outside air flow of the coolant tube 43a and the most downstream portions of the outside air flow of the refrigerant tubes 16a which constitute a part of the downstream side heat exchanging unit 72 are positioned on the same plane. The upstream most portion of the outside air flow of the coolant tube 43a is arranged on the downstream side in the direction of the outside air flow than the upstream most portions of the outer fins 50.

As described above, in the present embodiment, with respect to the outer fin 50 joined to both of the refrigerant tubes 16a and the coolant tubes 43a, the number of the refrigerant tubes 16a arranged in the outside air flowing direction X is differentiated from the number of the coolant tubes 43a arranged in the outside air flowing direction X. Accordingly, an area of the joint surface between the refrigerant tubes 16a and the outer fin 50 is differentiated from an area of the joint surface between the coolant tubes 43a and the outer fin 50. Hence, fine-adjustment of the heat exchange amounts among the three types of fluid can be achieved.

If the different types of tubes 16a and 43a are overlapped with each other in the air flowing direction, a total thickness (dimension in a direction vertical to the air flowing direction, i.e. dimension in a tube stacking direction) of the different types of tubes 16a and 43a need to be equalized, and hence flexibility in designs of the tubes 16a and 43a may be impaired.

In contrast, in the present embodiment, since the refrigerant tubes 16a are not arranged at a position overlapping the coolant tubes 43a constituting a part of the downstream side heat exchanging unit 72 in the outside air flowing direction X, the heat exchange amounts among the three types of fluids can be adjusted finely also by varying the thickness of the tubes 16a and 43a. Therefore, fine-adjustment of the heat exchange amounts among the three types of fluid can be achieved, while improving flexibility in design of the tubes 16a and 43a.

Third Embodiment

Figure 11:
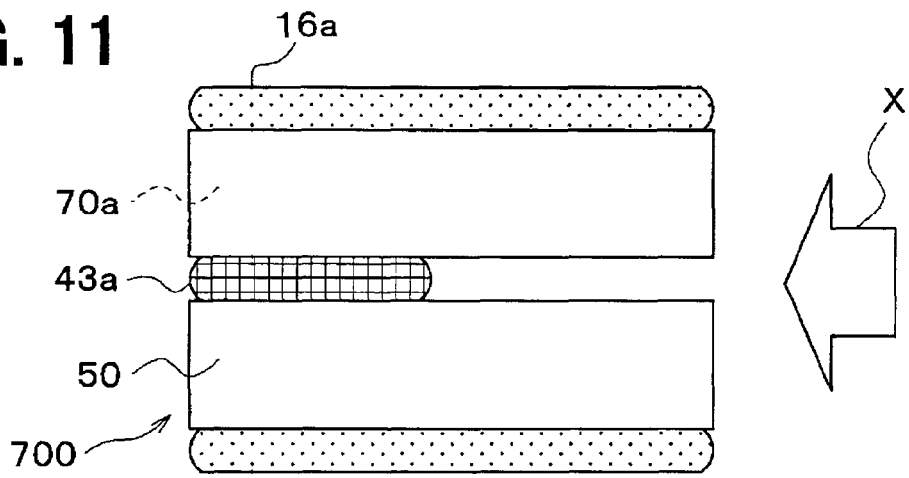
FIG. 11 is a schematic cross-sectional view of a heat exchanging unit of a heat exchanger of a third embodiment of the present disclosure in the longitudinal direction.

Next, a third embodiment of the present disclosure will be described with reference to FIG. 11. The third embodiment is different from the second embodiment described above in configuration of the heat exchanging unit. FIG. 11 is a drawing corresponding to FIG. 6 of the first embodiment.

As illustrated in FIG. 11, the combined heat exchanger 70 of the present embodiment is provided with a heat exchanging unit 700 provided by arranging refrigerant tubes 16a and coolant tubes 43a alternately in a stacked manner. In other words, the heat exchanger 70 of the second embodiment described above is provided with the upstream side heat exchanging unit 71 and the downstream side heat exchanging unit 72 arranged in series in the outside air flowing direction X, while the heat exchanger 70 of the present embodiment includes the single-row heat exchanging unit 700 in the outside air flowing direction X. In other words, the refrigerant tubes 16a and the coolant tube 43a of the heat exchanging unit 700 are arranged in a single row in a direction intersecting the outside air flowing direction X.

The thicknesses of the refrigerant tubes 16a and the coolant tube 43a are equal. The coolant tubes 43a have a dimension shorter than the refrigerant tubes 16a in the outside air flowing direction X. Specifically, the dimension of the coolant tube 43a in the outside air flowing direction X is an approximately half the dimension of the refrigerant tubes 16a in the outside air flowing direction X.

The most downstream portion of the outside air flow of the coolant tube 43a, the most downstream portion of the outside air flow of the refrigerant tubes 16a, and the most downstream portion of the outside air flow of outer fins 50 are positioned on the same plane. The upstream most portion of the outside air flow of the refrigerant tubes 16a in the direction of the outside air flow and the most downstream portion of the outer fins 50 in the direction of the outside air flow are positioned on the same plane. The upstream most portion of the outside air flow of the coolant tube 43a is arranged on the downstream side in the direction of the outside air flow than the upstream most portion of the direction of the outside air flow of the refrigerant tubes 16a and the upstream most portion of the outer fins 50 in the direction of the outside air flow.

In the heat exchanger 70 having the upstream side heat exchanging unit 71 and the downstream side heat exchanging unit 72 arranged in series in the outside air flowing direction X, a gap is provided between the tube which constitutes a part of the upstream side heat exchanging unit 71 and the tube which constitutes a part of the downstream side heat exchanging unit 72, and this gap is so-called a dead space.

In contrast, in the present embodiment, the heat exchanger 70 is configured to have the single-row heat exchanging unit 700 in the outside air flowing direction X, so that the dead space between the tube which constitutes a part of the upstream side heat exchanging unit 71 and the tube which constitutes a part of the downstream side heat exchanging unit 72 may be eliminated. Accordingly, since the dimension of the heat exchanger 70 in the outside air flowing direction X may be reduced, and hence a compact profile of the heat exchanger 70 is achieved.

Fourth Embodiment

Figure 12:
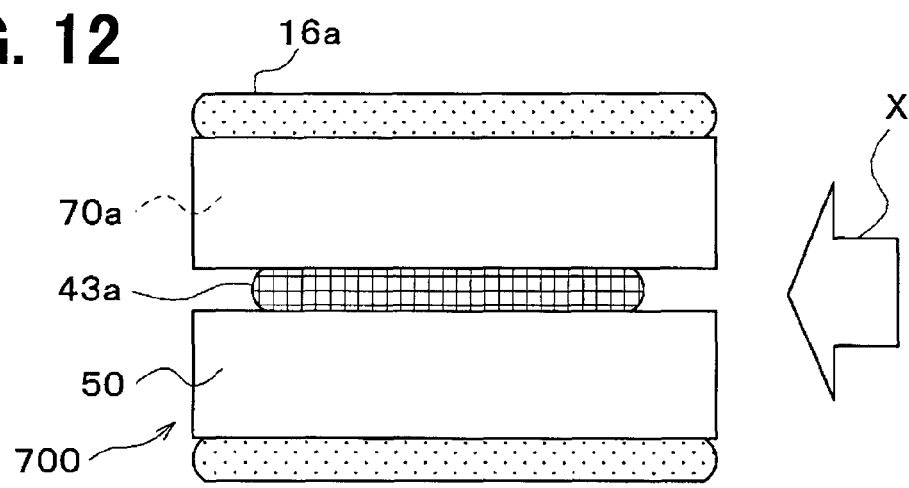
FIG. 12 is a schematic cross-sectional view of a heat exchanging unit of a heat exchanger of a fourth embodiment of the present disclosure in the longitudinal direction.

Next, a fourth embodiment of the present disclosure will be described with reference to FIG. 12. The fourth embodiment is different from the third embodiment described above in dimension and arrangement of the coolant tubes 43a. FIG. 12 is a drawing corresponding to FIG. 6 of the first embodiment.

As illustrated in FIG. 12, the dimension of the coolant tube 43a of the present embodiment in the outside air flowing direction X is approximately ⅔ the dimension of refrigerant tubes 16a in the outside air flowing direction X. The most downstream portion of the outside air flow of the coolant tube 43a is arranged on the upstream side of the most downstream portion of the outside air flow of the refrigerant tubes 16a in the direction of the outside air flow.

In the present embodiment, in comparison with the third embodiment described above, the dimension of the coolant tubes 43a in the outside air flowing direction X is increased and the coolant tubes 43a is arranged on the upstream side in the direction of the outside air flow. Accordingly, the heat exchange amount between the coolant and the outside air is sufficiently secured.

Fifth Embodiment

Figure 13:
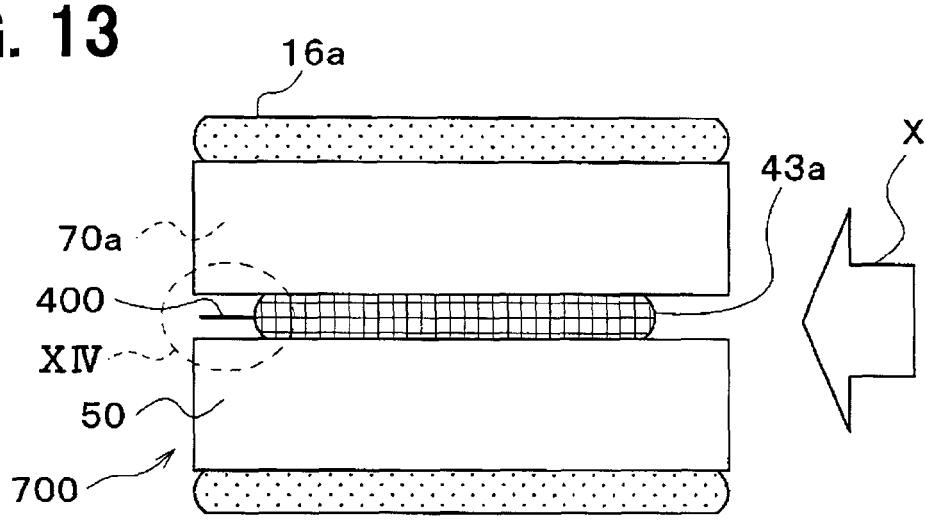
FIG. 13 is a schematic cross-sectional view of a heat exchanging unit of a heat exchanger of a fifth embodiment of the present disclosure in the longitudinal direction.

Next, a fifth embodiment of the present disclosure will be described with reference to FIG. 13 and FIG. 14. The fifth embodiment is different from the fourth embodiment described above in configuration of the coolant tubes 43a. FIG. 13 is a drawing corresponding to FIG. 6 of the first embodiment.

Figure 14:
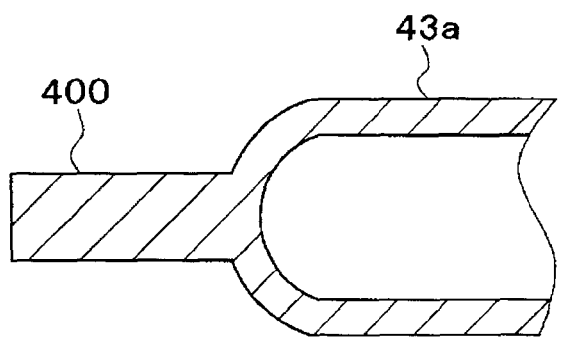
FIG. 14 is an enlarged view of a section XIV in FIG. 13.

As illustrated in FIG. 13 and FIG. 14, a rod-shaped protruding portion 400 is provided at the most downstream portion of the outside air flow of the coolant tube 43a in the present embodiment. The protruding portion 400 projects downstream of the coolant tube 43a in the direction of the outside air flow and extends in parallel to the outside air flowing direction X.

The protruding portion 400 is formed integrally with the coolant tube 43a. The protruding portion 400 is not in contact with the outer fins 50. The most downstream portion of the outside air flow of the protruding portion 400, the most downstream portion of the outside air flow of the refrigerant tubes 16a, and the most downstream portion of the outside air flow of the outer fins 50 are positioned on the same plane. The protruding portion 400 is not provided with the coolant flow channel in which coolant flows.

According to the present embodiment, by providing the protruding portions 400 on the coolant tubes 43a, and positioning the most downstream portions of the outside air flow of the protruding portion 400, the refrigerant tubes 16a, and the outer fins 50 in the direction of the outside air flow on the same plane, the end surface of a heat exchanging unit 700 on the downstream side in the direction of the outside air flow may be aligned when manufacturing the heat exchanging unit 700. Accordingly, productivity of the heat exchanger 70 may be improved.

Sixth Embodiment

Next, a sixth embodiment of the present disclosure will be described with reference to FIG. 15 to FIG. 20. The seventh embodiment is different from the second embodiment described above in that the intermediate plate member 752 includes two plate members in a stacked structure.

Figure 15:
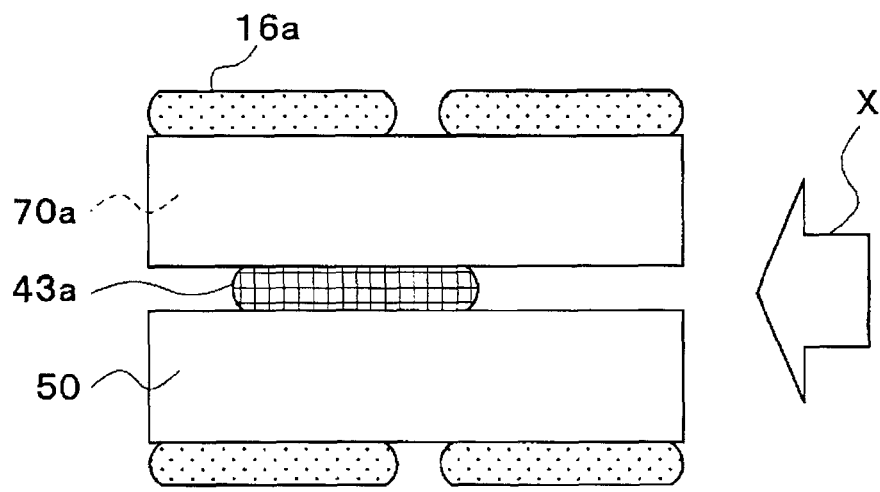
FIG. 15 is a schematic cross-sectional view of a heat exchanging unit of a heat exchanger of a sixth embodiment of the present disclosure in the longitudinal direction.
Figure 17:
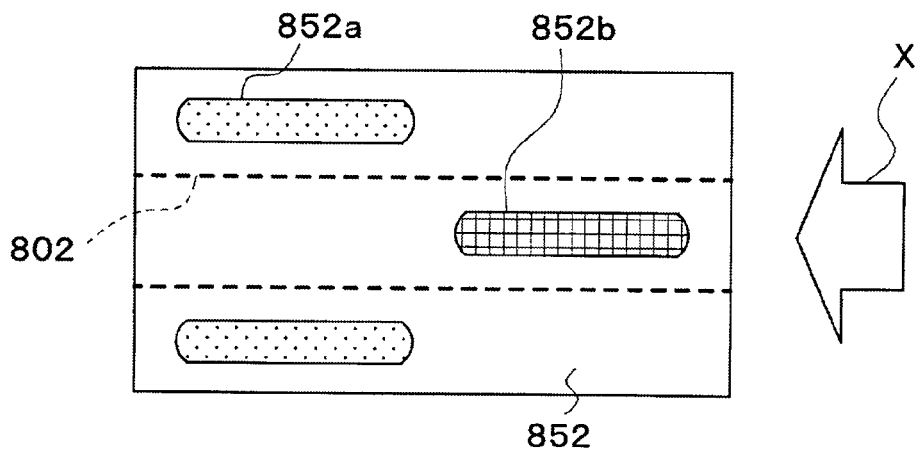
FIG. 17 is a schematic top view illustrating a second intermediate plate member which constitutes a part of the header tank of the heat exchanger of the sixth embodiment.
Figure 18:
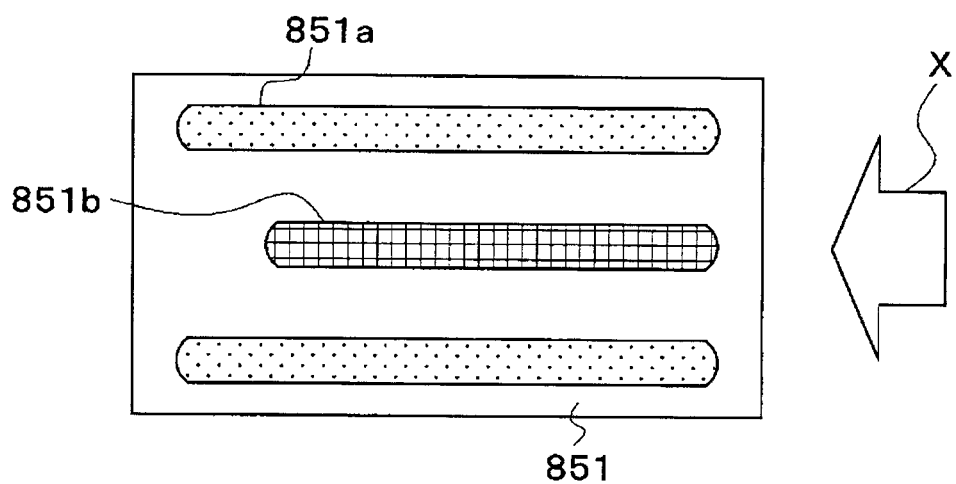
FIG. 18 is a schematic top view illustrating a first intermediate plate member which constitutes a part of the header tank of the heat exchanger of the sixth embodiment.
Figure 19:
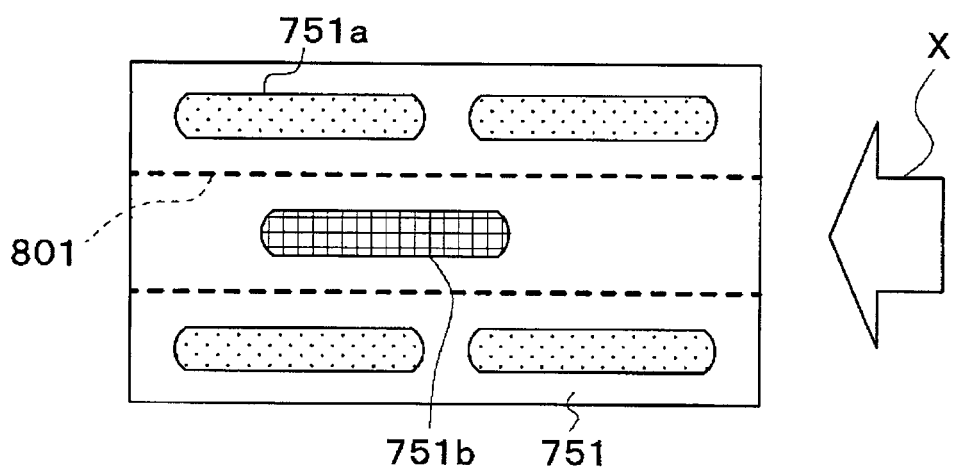
FIG. 19 is a schematic top view illustrating a header plate which constitutes a part of the header tank of the heat exchanger of the sixth embodiment.

FIG. 15 is a drawing corresponding to FIG. 6 of the first embodiment. In FIG. 17 to FIG. 19, a portion communicating with the refrigerant tube 16a is illustrated with dot hatching and a portion communicating with a coolant tube 43a is illustrated by grid hatching for clarifying the drawing.

As illustrated in FIG. 15, in the heat exchanger 70 of the present embodiment, the refrigerant tubes 16a and the coolant tube 43a are not overlapped in the outside air flowing direction X. The upstream most portion of the outside air flow of the coolant tube 43a is arranged on the upstream side of the most downstream portion of the outside air flow of the refrigerant tubes 16a which constitute part of the upstream side heat exchanging unit 71 in the direction of the outside air flow. The most downstream portion of the outside air flow of the coolant tube 43a is arranged on the downstream side in the direction of the outside air flow than the upstream most portion of the outside air flow of the refrigerant tubes 16a which constitute a part of a downstream side heat exchanging unit 72.

Figure 16:
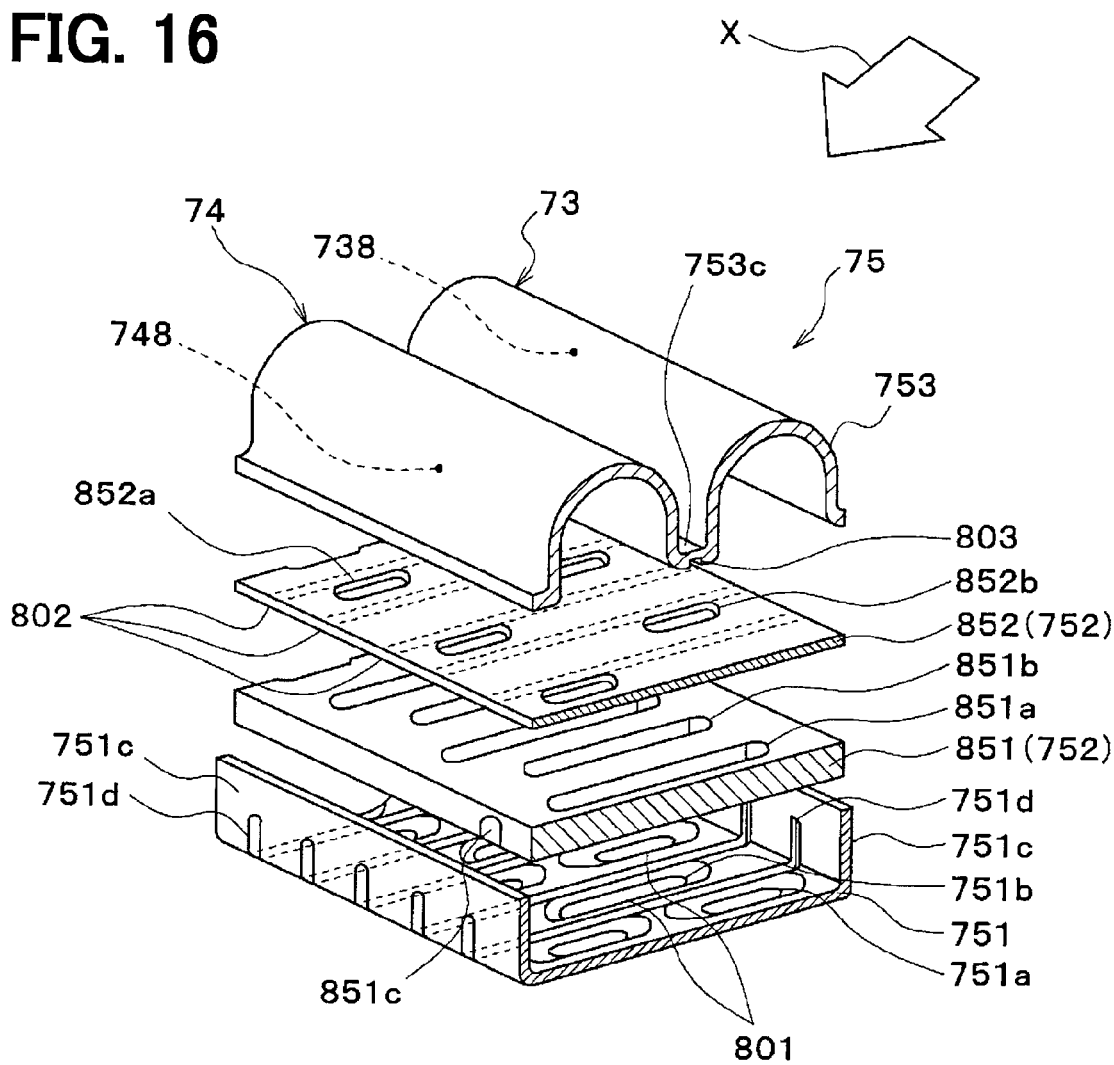
FIG. 16 is an exploded perspective view of a header tank of the heat exchanger of the sixth embodiment.

As illustrated in FIG. 16, the upstream side tank unit 73 is provided with an upstream side coolant space 738 configured to perform collection or distribution of the coolant flowing in the coolant tubes 43a provided therein. The downstream side tank unit 74 is provided with a downstream side refrigerant space 748 configured to perform collection or distribution of the coolant flowing in the refrigerant tubes 16a provided therein.

Here, the downstream side refrigerant space 748 of the present embodiment may correspond to the first fluid space configured to collect or distribute the first fluid flowing in the first tube, the downstream side tank unit 74 may correspond to a first fluid tank unit having a first fluid space, the upstream side coolant space 738 may correspond to a second fluid space configured to collect or distribute the second fluid flowing in the second tube, and the upstream side tank unit 73 may correspond to a second fluid tank unit having a second fluid space.

The intermediate plate member 752 includes two plate members, namely, a first intermediate plate member 851 and a second intermediate plate member 852 provided in a stacked manner. In other words, the header tank 75 includes the header plate 751, the first intermediate plate member 851, the second intermediate plate member 852, and the tank forming member 753.

The header plate 751 is provided with a refrigerant tube connecting hole 751a and a coolant tube connecting holes 751b joined by the refrigerant tubes 16a and the coolant tubes 43a inserted therein. The refrigerant tube connecting hole 751a and the coolant tube connecting holes 751b are formed so as to penetrate through a plate surface of the header plate 751 from the front to the back.

The refrigerant tube connecting hole 751a and the coolant tube connecting holes 751b are formed into a flat shape corresponding to a cross-sectional shape of outer peripheries of the refrigerant tubes 16a and the coolant tubes 43a, respectively, and outer peripheral surfaces of the refrigerant tubes 16a and the coolant tubes 43a are joined to the inner peripheral surfaces thereof.

The first intermediate plate member 851 is a plate-shaped member one plate surface of which is joined to the plate surface of the header plate 751. The first intermediate plate member 851 is provided with multiple refrigerant communicating holes 851a configured to allow the refrigerant to communicate and multiple coolant communicating holes 851b configured to allow the coolant to communicate. The refrigerant communicating holes 851a and the coolant communicating holes 851b are formed so as to penetrate through a plate surface of the first intermediate plate member 851 from the front to the back. The refrigerant communicating holes 851a and the coolant communicating hole 851b are formed into an elongated hole shape extending in the outside air flowing direction X.

More specifically, the refrigerant communicating holes 851a are formed into an elongated hole shape extending in the outside air flowing direction X so as to communicate with both of the refrigerant tubes 16a overlapped with each other in the flowing direction of the outside air. The both of the refrigerant tubes 16a are the refrigerant tubes 16a which constitute a part of the upstream side heat exchanging unit 71 and the refrigerant tubes 16a which constitute a part of the downstream side heat exchanging unit 72.

The coolant communicating holes 851b are formed into an elongated hole shape having a dimension shorter than that of the refrigerant communicating holes 851a in the outside air flowing direction X. The upstream most portion of the outside air flow of the coolant communicating holes 851b and the most downstream portion of the outside air flow of the refrigerant communicating holes 851a are positioned on the same plane. The most downstream portion of the coolant communicating holes 851b in the direction of the outside air flow is arranged on the upstream side of the most downstream portion of the outside air flow of the refrigerant communicating holes 851a in the direction of the outside air flow.

The second intermediate plate member 852 is a plate-shaped member one plate surface of which is joined to the other plate surface of the first intermediate plate member 851. The second intermediate plate member 852 is provided with a first through hole 852a, a second through holes 852b formed so as to penetrate through a plate surface of the second intermediate plate member 852 from the front to the back. The first through hole 852a and the second through holes 852b are formed into an elongated hole shape extending in the outside air flowing direction X.

The first through hole 852a is provided so as to be overlapped with the refrigerant communicating holes 851a when the first intermediate plate member 851 and the second intermediate plate member 852 are joined. In addition, the first through hole 852a is provided on a portion corresponding to the downstream side refrigerant space 748 (that is, the downstream side in the direction of the outside air flow) when the second intermediate plate member 852 and the tank forming member 753 are joined.

Accordingly, the refrigerant tubes 16a and the downstream side refrigerant space 748 in the downstream side tank unit 74 communicate with each other via the refrigerant tube connecting hole 751a, the refrigerant communicating holes 851a, and the first through hole 852a. Therefore, the refrigerant tube connecting hole 751a, the refrigerant communicating holes 851a, and the first through hole 852a of the present embodiment may be used as an example of a first fluid through hole in which the first fluid flows.

The second through holes 852b is provided so as to be overlapped with the coolant communicating holes 851b when the first intermediate plate member 851 and the second intermediate plate member 852 are joined. In addition, the second through holes 852b is provided on a portion corresponding to the upstream side coolant space 738 (that is, the upstream side in the direction of the outside air flow) when the second intermediate plate member 852 and the tank forming member 753 are joined.

Accordingly, the coolant tubes 43a and the upstream side coolant space 738 in the upstream side tank unit 73 communicate with each other via the coolant tube connecting holes 751b, the coolant communicating holes 851b, and the second through holes 852b. Therefore, the coolant tube connecting holes 751b, the coolant communicating holes 851b, and the second through holes 852b of the present embodiment may be used as an example of a second fluid through hole in which the second fluid flows.

The header plate 751 is provided with claw portions 751c on outer peripheral edge portions thereof. In a state in which the header plate 751, the intermediate plate members 851, 852, and the tank forming member 753 are assembled, the claw portions 751c are bent (swaged) toward the tank forming member 753, so that the header plate 751, the intermediate plate members 851, 852, and the tank forming member 753 are fixed.

The first intermediate plate member 851 is provided with multiple positioning portions 851c protruding locally outward on an outer peripheral edge portion thereof. The positioning portions 851c come into abutment with the claw portions 751c of the header plate 751, so that positioning of the first intermediate plate member 851 with respect to the header plate 751 is achieved.

Positioning of the second intermediate plate member 852 and the tank forming member 753 with respect to the header plate 751 is achieved by an abutment of the outer peripheral edge portions thereof against the claw portions 751c. Therefore, an external space (which is not illustrated) communicating with outside air is provided between the first intermediate plate member 851 and an inner side of the header plate 751 at a portion where the positioning portions 851c does not exist.

The header plate 751, the second intermediate plate member 852, and the tank forming member 753 are provided with groove portions 801, 802, 803, respectively.

Specifically, as illustrated in FIG. 16 and FIG. 19, the groove portions 801 as an example of the plate-side groove portion provided on the header plate 751 (hereinafter, referred to also as the first groove portions 801) are provided on the plate surface of the header plate 751 opposing the first intermediate plate member 851. The first groove portions 801 are formed by depressing the corresponding plate surface of the header plate 751. A plurality of the first groove portions 801 are formed linearly so as to extend from one end side to the other end side of the header plate 751 in the outside air flowing direction X across a portion between the refrigerant tube connecting hole 751a and the coolant tube connecting holes 751b adjacent to each other.

As illustrated in FIG. 16 and FIG. 17, the groove portions 802 as an example of the plate-side groove portion provided on the second intermediate plate member 852 (hereinafter, referred to also as the second groove portions 802) are provided on the plate surface of the second intermediate plate member 852 opposing the first intermediate plate member 851. The second groove portions 802 are formed by depressing the corresponding plate surface of the second intermediate plate member 852. The multiple second groove portions 802 are formed linearly so as to extend from one edge side to the other edge side of the second intermediate plate member 852 in the outside air flowing direction X across a portion between the first through hole 852a and the second through holes 852b, which are adjacent to each other.

In other words, the multiple groove portions 801, 802 are provided to extend from the portions between the refrigerant communicating holes 851a and the coolant communicating holes 851b to the edge portion of the first intermediate plate member 851 in the direction of the outside air flow. The portions between the refrigerant communicating holes 851a and the coolant communicating holes 851b are joint surfaces when the first intermediate plate member 851 is joined to the header plate 751 and the second intermediate plate member 852.

When the first intermediate plate member 851 is joined to the header plate 751 and the second intermediate plate member 852, the in-groove space in the groove portions 801, 802 communicates with the external space described above at the end portion thereof in the direction of the outside air flow. In other words, in-groove spaces in the groove portions 801, 802 extend continuously from between the refrigerant communicating holes 851a and the coolant communicating holes 851b adjacent to each other to the external space.

Figure 20:
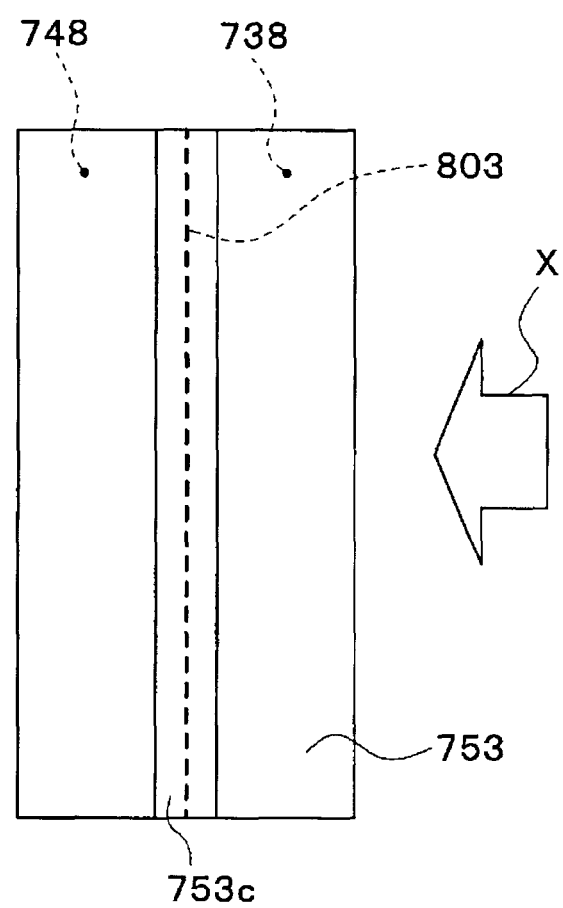
FIG. 20 is a schematic top view illustrating a tank forming member which constitutes a part of the header tank of the heat exchanger of the sixth embodiment.

As illustrated in FIG. 16 and FIG. 20, the groove portion 803 as a tank side groove portion provided on the tank forming member 753 (hereinafter, referred to as the third groove portion 803) is provided on a plate surface of the center portion 753c of the tank forming member 753 opposing the second intermediate plate member 852. The third groove portion 803 is formed by depressing the corresponding plate surface at the center portion 753c of the tank forming member 753. The third groove portion 803 is formed linearly so as to extend from one end side to the other end side of the center portion 753c in the tube stacking direction.

As illustrated in FIG. 16, the claw portions 751c of the header plate 751 are provided with slit holes 751d. The slit holes 751d are through holes penetrating through the header plate 751 from the front to the back. The slit holes 751d are provided at multiple positions corresponding to end portions of the groove portions 801, 802, 803.

According to the present embodiment, the groove portions 801, 802 are provided, respectively, on the header plate 751 and the second intermediate plate member 852. Even though the refrigerant flowing in the refrigerant communicating holes 851a or the coolant flowing in the coolant communicating holes 851b leaks from between the joint surfaces of the header plate 751, the first intermediate plate member 851 and the second intermediate plate member 852, the refrigerant or the coolant can be guided to the in-groove spaces provided in the groove portions 801, 802. Therefore, mixing of the coolant and the refrigerant can be restricted.

The groove portion 803 is provided on the tank forming member 753. Even though the coolant flowing in the upstream side coolant space 738 or the refrigerant flowing in the downstream side refrigerant space 748 leaks from between the joint surfaces of the tank forming member 753 and the second intermediate plate member 852, the refrigerant or the coolant can be guided to an in-groove space provided in the groove portion 803. Therefore, mixing of the coolant and the refrigerant can be restricted.

In addition, since the in-groove spaces communicate with the outside through the slit holes 751d, the refrigerant and the coolant leaked through between the above-described joint surfaces can be discharged to the outside of the heat exchanger 70. Therefore, mixing one of the refrigerant and the coolant, leaked through between the joint surfaces, with the other fluid in the refrigerant communicating holes 851a, the coolant communicating holes 851b, the upstream side coolant space 738 or the downstream side refrigerant space 748 can be restricted.

At this time, in the heat exchanger 70 of the present embodiment, the refrigerant tubes 16a and the coolant tubes 43a are not overlapped with each other in the outside air flowing direction X, and hence the groove portions 801, 802 can be provided linearly. Therefore, mixing of the refrigerant and the coolant can be restricted in the header tank 75 with a simple configuration.

Seventh Embodiment

Figure 21:
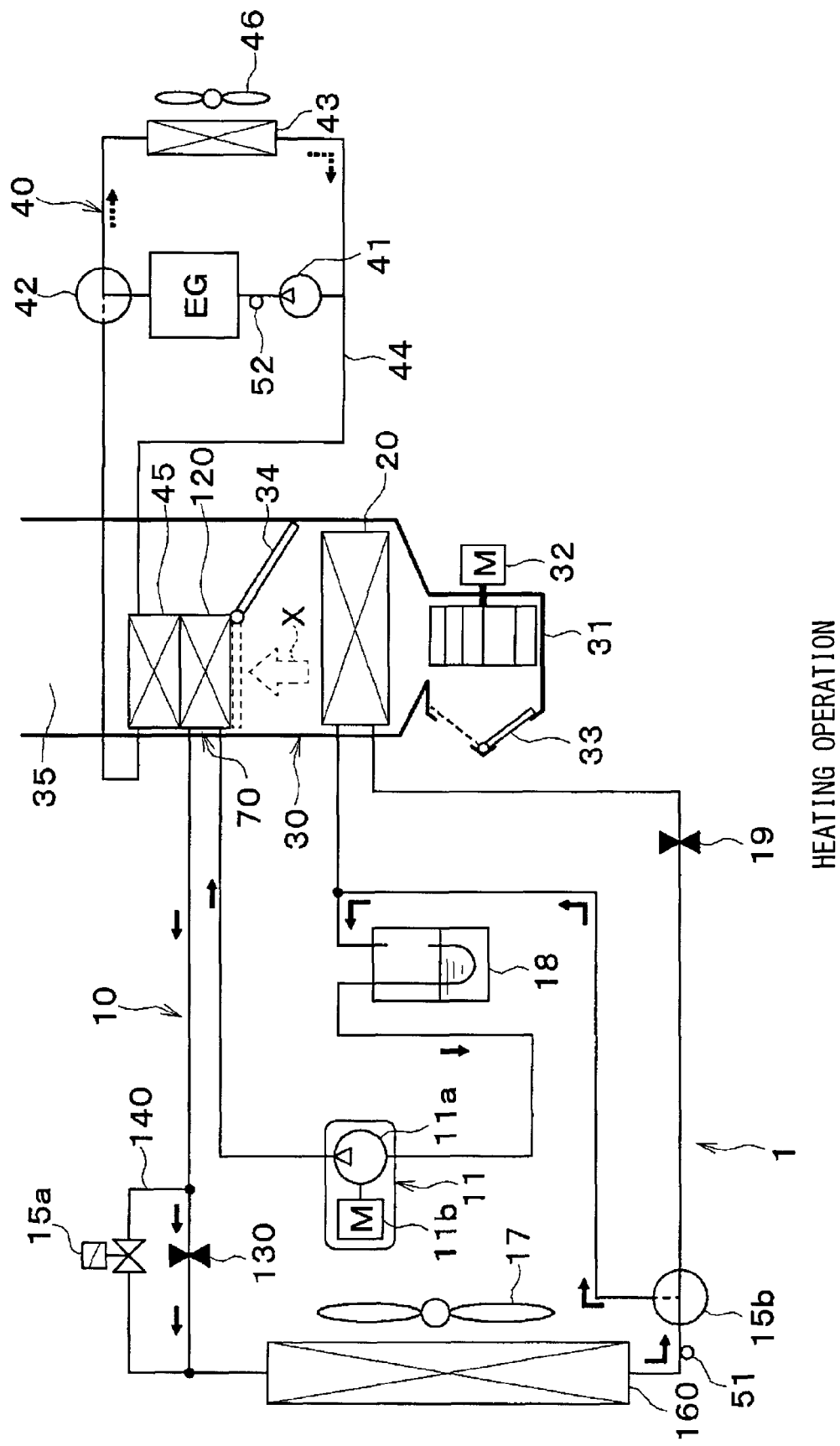
FIG. 21 is a schematic diagram illustrating the heating operation in the heat pump cycle of a seventh embodiment of the present disclosure.
Figure 22:
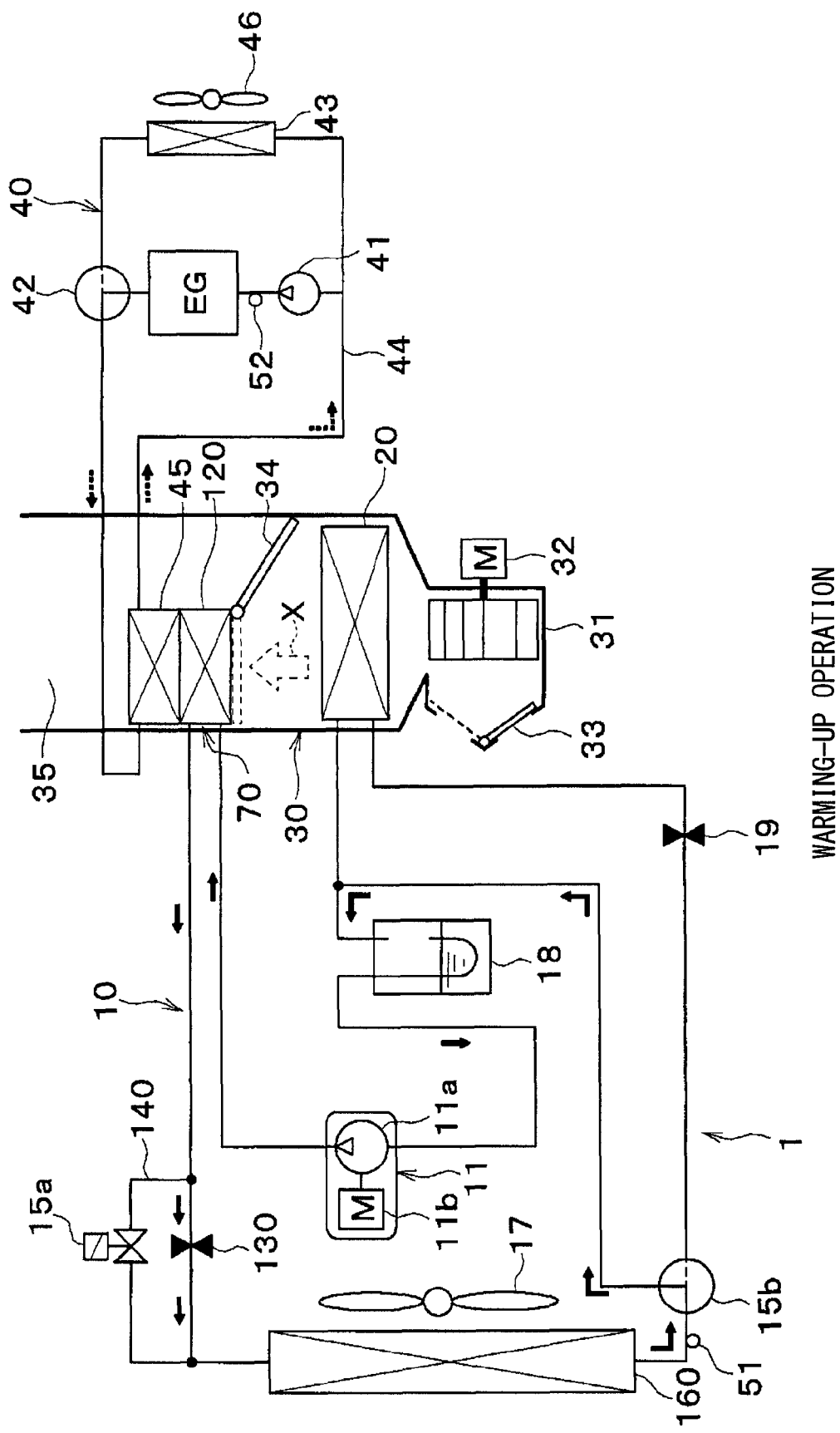
FIG. 22 is a schematic diagram illustrating a warming-up operation in the heat pump cycle of the seventh embodiment.
Figure 23:
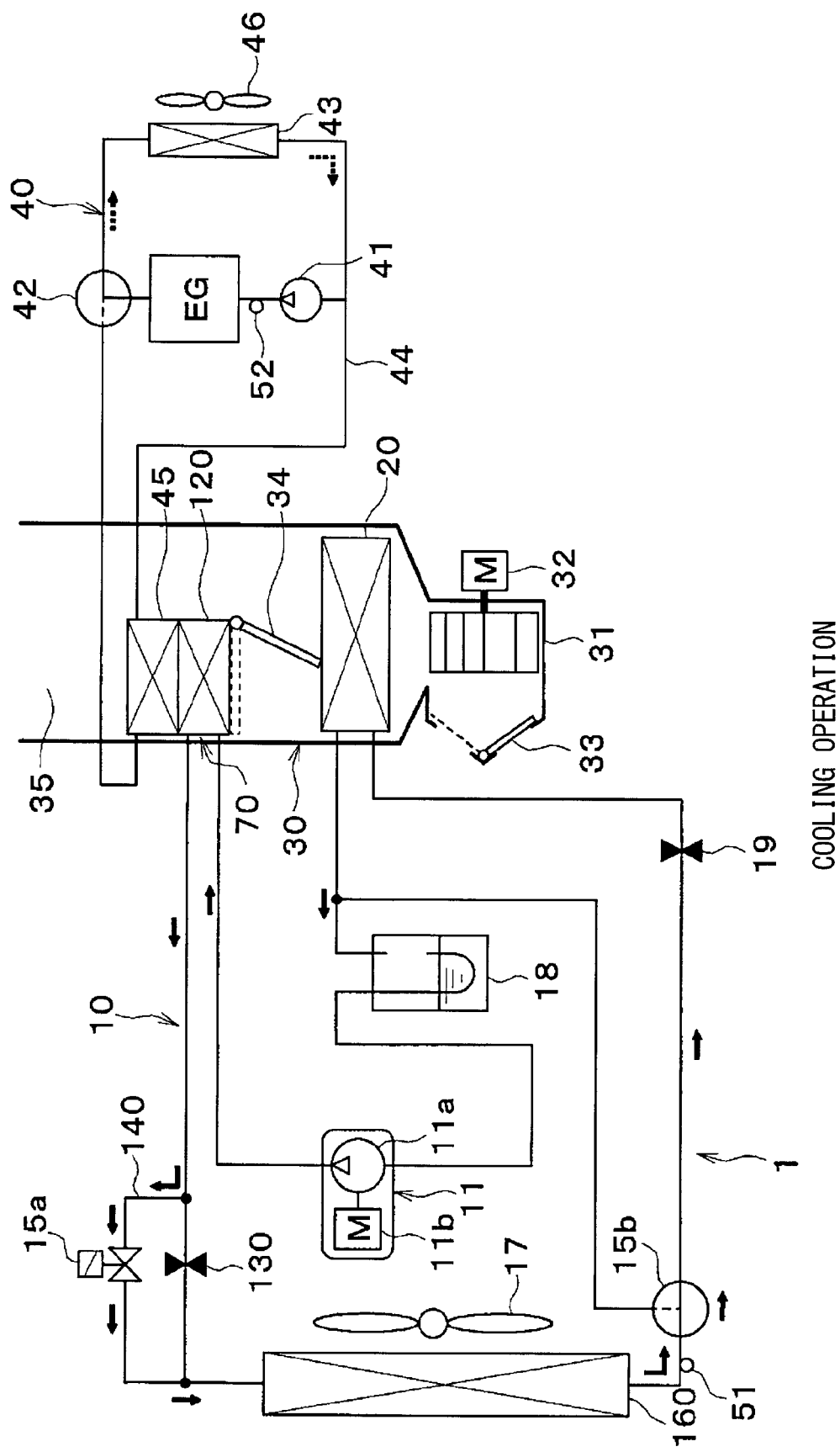
FIG. 23 is a schematic diagram illustrating a cooling operation in the heat pump cycle of the seventh embodiment.

Next, a seventh embodiment of the present disclosure will be described with reference to FIG. 21 to FIG. 23. In the present embodiment, an example in which configurations of the heat pump cycle 10 and the coolant circulation circuit 40 of the first embodiment are modified as illustrated in general configuration drawings in FIG. 21 to FIG. 23 will be described. In FIG. 21 to FIG. 23, a flow of a refrigerant in the heat pump cycle 10 is indicated by an arrow of a solid line, and a flow of a coolant in the coolant circulation circuit 40 is indicated by broken line arrows.

Specifically, the coolant circulation circuit 40 of the present embodiment is a coolant circulation circuit configured to circulate the coolant as a cooling medium (heat medium) to the coolant passage provided in the interior of an engine EG, which is one of the vehicle-mounted devices associated with heat generation at the time of operation to cool the engine EG. In other words, in the present embodiment, the traveling electric motor MG of the first embodiment is eliminated, and instead, the engine EG is arranged.

In addition, in the present embodiment, the indoor condenser 12 of the first embodiment is eliminated, and the combined heat exchanger 70 of the first embodiment is arranged in the casing 31 of the indoor air conditioning unit 30. The outdoor heat exchanging unit 16 of the first embodiment in the heat exchanger 70 functions as the indoor condenser 12. Hereinafter, a portion of the heat exchanger 70 functions as the indoor condenser 12 is expressed as an indoor condenser.

The radiator unit 43 of the first embodiment in the heat exchanger 70 functions as a heat collection heat exchanging unit 45 for heating the coolant by heat of the refrigerant. Accordingly, in the heat pump cycle 10 of the present embodiment, a warming-up operation for warming up the engine by heating the coolant by the heat of the refrigerant can be executed. The heat collection heat exchanging unit 45 is arranged in the bypass passage 44 of the coolant circulation circuit 40.

In contrast, the outdoor heat exchanging unit 16 is configured as a single heat exchanger configured to cause the refrigerant that flows in an interior and an outside air blown from the blower fan 17 to exchange heat with each other. In the same manner, the radiator unit 43 is configured as a single heat exchanger configured to cause the coolant flowing in the interior and an outside air blown from a blower fan 46 to exchange heat with each other.

Other structures are the same as those of the first embodiment. In the present embodiment, although the warming-up operation is executed instead of a defrosting operation, other operations are the same as those of the first embodiment.

Next, the warming-up operation will be described. In order to restrict an overheat of the engine EG, a temperature of the coolant is maintained to be temperatures not higher than a predetermined upper limit temperature, and in order to reduce a friction loss caused by an increase in viscosity of lubricating oil sealed in the interior of the engine EG, the temperature of the coolant is preferably maintained to be temperatures not lower than a lower limit temperature.

Accordingly, in the heat pump cycle 10 of the present embodiment, the warming-up operation is executed when the coolant temperature Tw is decreased to a predetermined reference temperature or below at the time of the heating operation. In this warming-up operation, the three-direction valve 15b in the heat pump cycle 10 is operated in the same manner as in the normal heating operation, and the three-direction valve 42 of the coolant circulation circuit 40 is switched to a coolant circuit that causes the coolant to bypass the radiator unit 43 as indicated by broken line arrows in FIG. 22, that is, causes the coolant to flow into the heat collection heat exchanging unit 45.

Therefore, as illustrated by arrows of the solid line in FIG. 22, high-pressure high-temperature refrigerant discharged from the compressor 11 flows into the indoor condenser 12 in the same manner as in the normal heating operation. A heat of the high-temperature high-pressure refrigerant that flows into the indoor condenser 12 is transferred to blown air blown by the blower 32 and is transferred to the coolant via the outer fins 50 since the circuit is switched to the coolant circuit which allows the three-direction valve 42 to flow the coolant into the heat collection heat exchanging unit 45. Other operations are the same as those at the normal heating operation.

As described thus far, at the time of warming-up operation, vehicle-interior blown air is heated in the indoor condenser 12 by the heat of the refrigerant discharged from the compressor 11, so that the vehicle interior may be heated. The heat of the refrigerant discharged from the compressor 11 in the indoor condenser 12 is also transferred to the coolant via the outer fins 50, so that the temperature of the coolant increases. Therefore, by using the heat of the refrigerant, the warming-up of the engine EG is achieved.

The heat exchanger 70 described in the second to the sixth embodiments may be applied to the heat pump cycle 10 of the present embodiment as a matter of course.

The present disclosure is not limited to the above-mentioned embodiments, and may have various modifications as described below without departing from the gist of the present disclosure.

Figure 24:
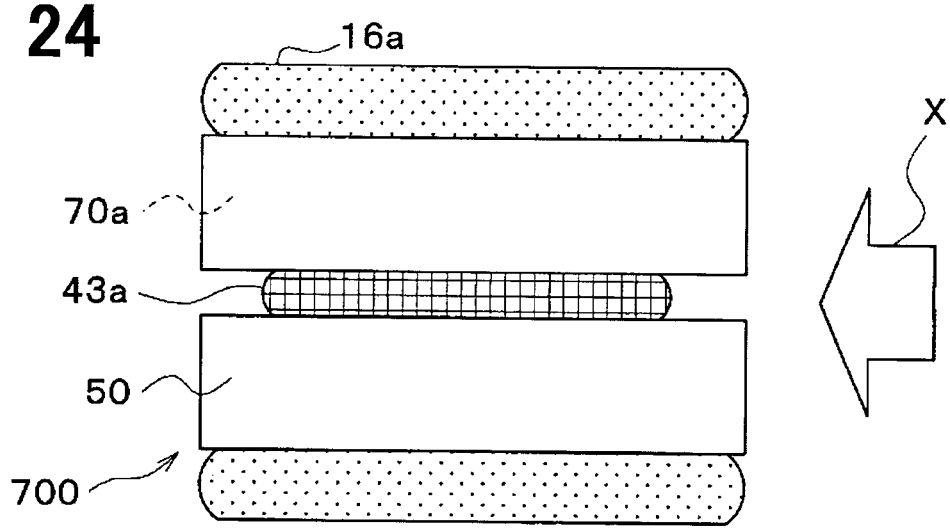
FIG. 24 is a schematic cross-sectional view of a heat exchanging unit of a heat exchanger of a modification in the longitudinal direction.
Figure 25:
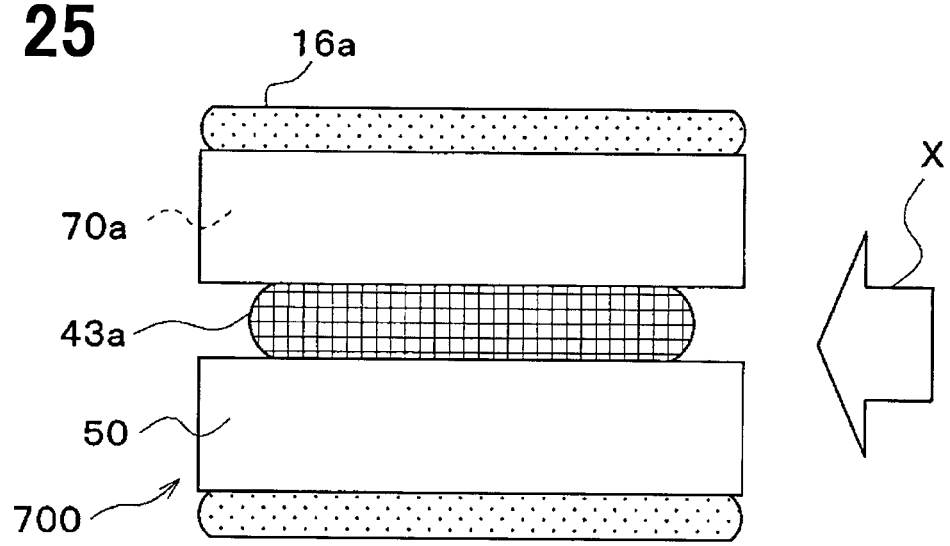
FIG. 25 is a schematic cross-sectional view of the heat exchanging unit of the heat exchanger of a modification in the longitudinal direction.

(1) In the embodiments described above, an example in which the thickness of the refrigerant tubes 16a and the thickness of the coolant tubes 43a are the same has been described. However, the present invention is not limited thereto, and the thickness of the refrigerant tubes 16a may be larger than the thickness of the coolant tubes 43a as illustrated in FIG. 24, for example. As illustrated in FIG. 25, the thickness of the coolant tubes 43a may be larger than the thickness of the refrigerant tubes 16a.

In this manner, fine-adjustment of the heat exchange amounts among the three types of fluid is achieved by varying the thicknesses of the refrigerant tubes 16a and the coolant tubes 43a.

When the thickness of the coolant tubes 43a is set to be larger than the thickness of the refrigerant tubes 16a, a larger amount of air can be introduced from the side portion of the outer fins 50 in the vicinity of the upstream most portion of the outside air flow of the coolant tubes 43a when the upstream most portion of the outside air flow of the outside air passage 70a is clogged by the frost. Therefore, the clogging of the outside air passage 70a due to the frost formation is further restricted, and hence frost formation resistance properties may further be improved.

(2) In the fifth embodiment described above, an example in which the protruding portion 400 is provided on the most downstream portion of the outside air flow of the coolant tubes 43a has been descried. However, the position of arrangement and the shape of the protruding portion 400 are not limited thereto.

For example, the protruding portion 400 may be provided in the coolant tubes 43a at the upstream most portion of the outside air flow. In this case, the resistance for chipping (pitching stone during the travel) is improved. The protruding portion 400 may be provided at one of the upstream most portion of the outside air flow and the most downstream portion of the outside air flow of the coolant tube 43a, which is closer to the end portions of the refrigerant tubes 16a in the direction of the outside air flow. In this case, the volume of the protruding portion 400 can be reduced, and hence manufacturing cost may be reduced. The protruding portion 400 may be provided in the refrigerant tubes 16a.

Figure 26:
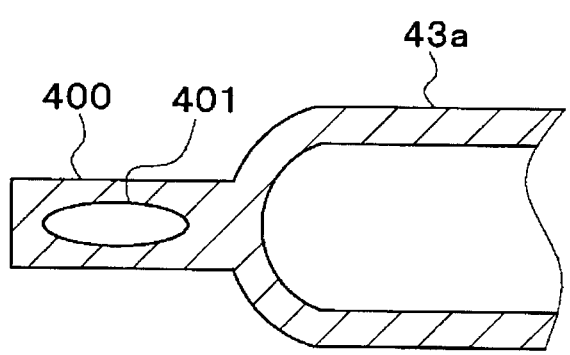
FIG. 26 is an enlarged cross-sectional view illustrating a coolant tube of the heat exchanger of a modification.
Figure 27:
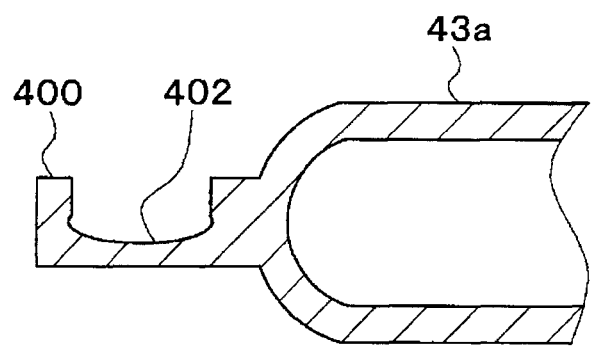
FIG. 27 is an enlarged cross-sectional view illustrating the coolant tube of the heat exchanger of a modification.

In the fifth embodiment described above, an example in which the protruding portion 400 is formed in a rod shape extending in the outside air flowing direction X has been described. However, the present invention is not limited thereto, and a through hole 401 may be provided in the protruding portion 400 as illustrated in FIG. 26. Alternatively, a depressed portion 402 may be provided on the protruding portion 400 as illustrated in FIG. 27. In this configuration, the weight of the protruding portion 400 is reduced, and hence the weight reduction of the heat exchanger 70 is achieved.

(3) In the sixth embodiment described above, an example in which the groove portions 801, 802 are provided on the header plate 751 and the second intermediate plate member 852 respectively has been described. However, the present invention is not limited thereto, and the groove portions 801, 802 may be provided on both surfaces of the first intermediate plate member 851, respectively.

Figure 28:
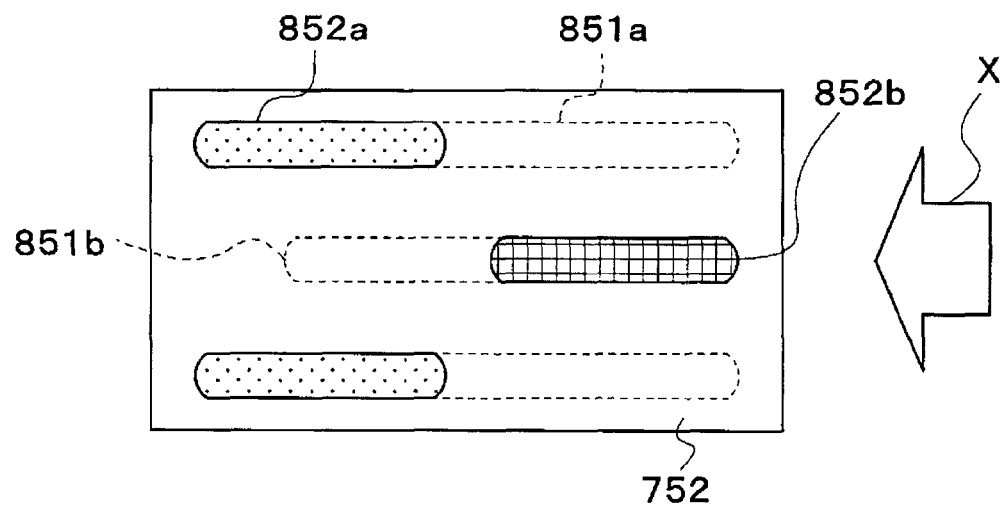
FIG. 28 is a schematic top view illustrating an intermediate plate member which constitutes a part of the header tank of the heat exchanger of a modification.

(4) In the sixth embodiment described above, an example in which the first intermediate plate member 851 and the second intermediate plate member 852 are provided as separate members has been described. However, the present invention is not limited thereto, and the first intermediate plate member 851 and the second intermediate plate member 852 may be provided as an integral intermediate plate member 752 as illustrated in FIG. 28.

In this case, since no joint surface exists between the first intermediate plate member 851 and the second intermediate plate member 852, the refrigerant or the coolant is prevented from being leaked from the corresponding joint surface. Therefore, since the second groove portions 802 do not have to be provided, the refrigerant and the coolant can be prevented from being mixed in a simpler configuration.

(5) In the first embodiment described above, an example in which the refrigerant in the heat pump cycle 10 is employed as an example of the first fluid and the coolant of the coolant circulation circuit 40 is employed as an example of the second fluid, and the outside air blown by the blower fan 17 is employed as an example of the third fluid has been described. However, the first to the third fluid are not limited thereto. For example, in the same manner as the seventh embodiment, the vehicle-interior blown air may be employed as the third fluid. The third fluid may also be coolant.

For example, the first fluid may be a high-pressure side refrigerant or may be a low-pressure side refrigerant of the heat pump cycle 10.

For example, coolant for cooling, for example, electric device such as an inverter configured to supply power to the engine, and the traveling electric motor MG may be employed as the second fluid. Oil for cooling may be employed as the second fluid to cause the second heat exchanging unit to function as an oil cooler or a heat storage agent, a cooling storage agent or the like may be employed as the second fluid.

In addition, when the heat pump cycle 10 to which the heat exchanger 70 of the present disclosure is applied is applied to a stationary air conditioning apparatus, a cool temperature storage, a cooling and heating apparatus for an automatic vending machine or the like, a coolant for cooling an engine, an electric motor, and other electric devices as a drive source of the compressor of the heat pump cycle 10 may be employed as the second fluid.

In addition, in the embodiments described above, an example in which the heat exchanger 70 of the present disclosure is applied to the heat pump cycle (the refrigeration cycle) has been described. However, the application of the heat exchanger 70 of the present disclosure is not limited thereto. In other words, the heat exchanger 70 may be applied widely to apparatuses which perform heat exchange among three types of fluid.

For example, the heat exchanger 70 may be applied as a heat exchanger applied to a vehicle cooling system. A configuration in which the first fluid is a heat medium which has absorbed a heat of a first vehicle-mounted device associated with heat generation at the time of operation, the second fluid is a heat medium which has absorbed a heat of a second vehicle-mounted device associated with heat generation at the time of operation, and the third fluid is outdoor air is also applicable.

More specifically, in the case of being applied to a hybrid vehicle, a configuration in which the first vehicle-mounted device is the engine EG, the first fluid is a coolant of the engine EG, the second vehicle-mounted device is a traveling electric motor, and the second fluid is a coolant of the traveling electric motor is also applicable.

Amounts of heat generation of these vehicle-mounted devices vary respectively in accordance with a traveling state (traveling load) of the vehicle, so that the temperature of the coolant of the engine EG and the temperature of the coolant of the traveling electric motor vary in accordance with the traveling state of the vehicle as well. Therefore, according to this example, the heat generated by the vehicle-mounted devices which generate a large amount of heat may be radiated not only to air, but also to vehicle-mounted devices which generate heat by a small amount.

As the first vehicle-mounted device or the second vehicle-mounted device, an exhaust air reflux apparatus (EGR), a supercharger, a power steering apparatus, a battery, and the like may be employed. The heat exchanging unit may function, for example, as an EGR cooler, an intercooler, or an oil cooler for cooling power steering oil.

The first and second fluids may be the same type of fluid having different temperatures. For example, the first fluid and the second fluid may be refrigerants having different temperatures from each other, or may be coolants having different temperatures from each other. The first fluid and the second fluid may be fluids configured to flow in flow channels (circuits) different from each other, and may be fluids branched from the one flow channel (circuit).

(6) In the embodiment described above, an example in which the electric three-direction valve 42 is employed as the circuit switching means configured to switch the cooling medium circuit of the coolant circulation circuit 40 has been described. However, the circuit switching means is not limited thereto. For example, a thermostat valve may be employed. The thermostat valve is a cooling medium temperature reaction valve including a mechanic mechanism for opening and closing a cooling medium path by displacing a valve body by a thermo wax (temperature sensing member) which is changed in volume in accordance with the temperature. Therefore, by employing the thermostat valve, the coolant temperature sensor 52 may be eliminated.

(7) In the above embodiment, an example in which a normal fluorocarbon refrigerant is employed as the refrigerant has been described. However, the type of the refrigerant is not limited thereto. A natural refrigerant such as carbon dioxide or a hydrocarbon system refrigerant may be employed. Furthermore, the heat pump cycle 10 may constitute a part of a supercritical refrigeration cycle in which the discharged refrigerant of the compressor 11 has a critical pressure of the refrigerant or higher.

What is claimed is:

1. A heat exchanger comprising:
   a heat exchanging unit including first tubes, in which a first fluid flows, second tubes, in which a second fluid flows, or both the first tubes and the second tubes, which are arranged in a stacked manner, the heat exchanging unit allowing at least one of the first fluid and the second fluid to exchange heat with a third fluid;
   third fluid passages each of which is a space provided between adjacent tubes of the tubes of the heat exchanging unit, the third fluid flowing through the third fluid passages;
   outer fins that are disposed in the third fluid passages and joined to at least one of outer surfaces of the first tubes and outer surfaces of the second tubes, the outer fins accelerating heat transfer between the fluids; and
   protruding portions which protrude downstream in the flow direction of the third fluid from downstream ends of the second tubes, wherein
   at least one of the outer fins is joined to both of the first tubes and the second tubes,
   an area of a joint surface between the first tubes and the at least one of the outer fins is different from an area of a joint surface between the second tubes and the at least one of the outer fins,
   a length of the first tubes joined to the at least one of the outer fins in a flow direction of the third fluid is different from a length of the second tubes joined to the at least one of the outer fins in the flow direction of the third fluid, and
   downstream ends of the first tubes and downstream ends of the protruding portions are located at a same position in the flow direction of the third fluid.

2. A heat exchanger comprising:
   a heat exchanging unit including first tubes, in which a first fluid flows, second tubes, in which a second fluid flows, or both the first tubes and the second tubes, which are arranged in a stacked manner, the heat exchanging unit allowing at least one of the first fluid and the second fluid to exchange heat with a third fluid;

third fluid passages each of which is a space provided between adjacent tubes of the tubes of the heat exchanging unit, the third fluid flowing through the third fluid passages;

outer fins that are disposed in the third fluid passages and joined to at least one of outer surfaces of the first tubes and outer surfaces of the second tubes, the outer fins accelerating heat transfer between the fluids; and protruding portions which protrude downstream in the flow direction of the third fluid from downstream ends of the second tubes, wherein at least one of the outer fins is joined to both of the first tubes and the second tubes, an area of a joint surface between the first tubes and the at least one of the outer fins is different from an area of a joint surface between the second tubes and the at least one of the outer fins, a number of the first tubes joined to the at least one of the outer fins and arranged in a flow direction of the third fluid is different from a number of the second tubes joined to the at least one of the outer fins and arranged in the flow direction of the third fluid, and downstream ends of the first tubes and downstream ends of the protruding portions are located at a same position in the flow direction of the third fluid.

3. The heat exchanger according to claim 1, wherein a thickness of the first tube in a direction vertical to the flow direction of the third fluid is different from a thickness of the second tube in a direction vertical to the flow direction of the third fluid.

4. A heat exchanger comprising:

a heat exchanging unit including first tubes, in which a first fluid flows, second tubes, in which a second fluid flows, or both the first tubes and the second tubes, which are arranged in a stacked manner, the heat exchanging unit allowing at least one of the first fluid and the second fluid to exchange heat with a third fluid;

third fluid passages each of which is a space provided between adjacent tubes of the tubes of the heat exchanging unit, the third fluid flowing through the third fluid passages;

outer fins that are disposed in the third fluid passages and joined to at least one of outer surfaces of the first tubes and outer surfaces of the second tubes, the outer fins accelerating heat transfer between the fluids;

a first fluid tank unit extending in a stacking direction of the first tubes and including a first fluid space in or from which the first fluid flowing in the first tubes is collected or distributed; and a second fluid tank unit extending in a stacking direction of the second tubes and including a second fluid space in or from which the second fluid flowing in the second tubes is collected or distributed, wherein the first fluid tank unit and the second fluid tank unit include:

a header plate to which both of the first tubes and the second tubes are fixed;

a first intermediate plate member and a second intermediate plate member which are fixed to the header plate; and a tank forming member fixed to the header plate and the second intermediate plate member and having the first fluid space and the second fluid space, the header plate includes a first fluid through hole through which the first fluid flows, and a second fluid through hole through which the second fluid flows, the first intermediate plate member includes a first fluid through hole through which the first fluid flows, and a second fluid through hole through which the second fluid flows, the second intermediate plate member includes a first fluid through hole through which the first fluid flows, and a second fluid through hole through which the second fluid flows, the first tubes and the first fluid space of the first fluid tank unit communicate with each other through the first fluid through holes of the header plate, the first intermediate plate member and the second intermediate plate member, the second tubes and the second fluid space of the second fluid tank unit communicate with each other through the second fluid through holes of the header plate, the first intermediate plate member and the second intermediate plate member, the first tubes and the second tubes are arranged without overlapping each other in the flow direction of the third fluid, two of the header plate, the first intermediate plate member, and the second intermediate plate member are joined to each other, at least one of plate surfaces of the two joined to each other includes a plate-side groove portion extending in the flow direction of the third fluid, and an in-groove space provided in the plate-side groove portion continuously extends from between the first fluid through hole and the second fluid through hole adjacent to each other to outside the first fluid tank unit and the second fluid tank unit, at least one of the outer fins is joined to both of the first tubes and the second tubes, an area of a joint surface between the first tubes and the at least one of the outer fins is different from an area of a joint surface between the second tubes and the at least one of the outer fins, and a length of the first tubes joined to the at least one of the outer fins in a flow direction of the third fluid is different from a length of the second tubes joined to the at least one of the outer fins in the flow direction of the third fluid.

5. The heat exchanger according to claim 4, wherein a joint surface between the second intermediate plate member and the tank forming member includes a tank-side groove portion extending in a stacking direction of the first tubes and the second tubes, and an in-groove space provided in the tank-side groove portion continuously extends from between the first fluid space and the second fluid space adjacent to each other to outside the first fluid tank unit and the second fluid tank unit.

6. The heat exchanger according to claim 4, wherein the first intermediate plate member and the second intermediate plate member are integrated.

7. The heat exchanger according to claim 1, wherein the first tubes and the second tubes of the heat exchanging unit are arranged in a single row in a direction intersecting the flow direction of the third fluid.

8. The heat exchanger according to claim 1, being used as a radiator that radiates heat of a refrigerant discharged from a compressor in a vapor compression refrigeration cycle, wherein the first fluid is the refrigerant in the refrigeration cycle,
the second fluid is a heat medium that has absorbed heat of an external heat source, and
the third fluid is air.

9. The heat exchanger according to claim 1, wherein
the first fluid or the second fluid, whichever is lower in temperature, flows in one of the first tubes and the second tubes to which the at least one of the outer fins is joined,
the first fluid or the second fluid, whichever is higher in temperature, flows in the other of the first tubes and the second tubes to which the at least one of the outer fins is joined, and
the length of the one tubes in the flow direction of the third fluid is smaller than the length of the other tubes in the flow direction of the third fluid.

10. The heat exchanger according to claim 1, wherein
the first fluid or the second fluid, whichever is lower in temperature, flows in one of the first tubes and the second tubes to which the at least one of the outer fins is joined,
the first fluid or the second fluid, whichever is higher in temperature, flows in the other of the first tubes and the second tubes to which the at least one of the outer fins is joined, and
the number of the one tubes arranged in the flow direction of the third fluid is smaller than the number of the other tubes aligned in the flow direction of the third fluid.

11. A heat exchanger comprising:
a heat exchanging unit including first tubes, in which a first fluid flows, second tubes, in which a second fluid flows, or both the first tubes and the second tubes, which are arranged in a stacked manner, the heat exchanging unit allowing at least one of the first fluid and the second fluid to exchange heat with a third fluid;
third fluid passages each of which is a space provided between adjacent tubes of the tubes of the heat exchanging unit, the third fluid flowing through the third fluid passages; and
outer fins that are disposed in the third fluid passages and joined to at least one of outer surfaces of the first tubes and outer surfaces of the second tubes, the outer fins accelerating heat transfer between the fluids, wherein
at least one of the outer fins is joined to both of the first tubes and the second tubes,
an area of a joint surface between the first tubes and the at least one of the outer fins is different from an area of a joint surface between the second tubes and the at least one of the outer fins,
a length of the first tubes joined to the at least one of the outer fins in a flow direction of the third fluid is different from a length of the second tubes joined to the at least one of the outer fins in the flow direction of the third fluid, wherein
the first tube is a refrigerant tube through which a refrigerant flows,
the second tube is a coolant tube through which a coolant flows, and
a thickness of the coolant tube in a direction vertical to the flow direction of the third fluid is thicker than a thickness of the refrigerant tube in a direction vertical to the flow direction of the third fluid.

12. A heat exchanger comprising:
a heat exchanging unit including first tubes, in which a first fluid flows, second tubes, in which a second fluid flows, or both the first tubes and the second tubes, which are arranged in a stacked manner, the heat exchanging unit allowing at least one of the first fluid and the second fluid to exchange heat with a third fluid;
third fluid passages each of which is a space provided between adjacent tubes of the tubes of the heat exchanging unit, the third fluid flowing through the third fluid passages; and
outer fins that are disposed in the third fluid passages and joined to at least one of outer surfaces of the first tubes and outer surfaces of the second tubes, the outer fins accelerating heat transfer between the fluids, wherein
at least one of the outer fins is joined to both of the first tubes and the second tubes,
an area of a joint surface between the first tubes and the at least one of the outer fins is different from an area of a joint surface between the second tubes and the at least one of the outer fins,
a number of the first tubes joined to the at least one of the outer fins and arranged in a flow direction of the third fluid is different from a number of the second tubes joined to the at least one of the outer fins and arranged in the flow direction of the third fluid, wherein
the first tube is a refrigerant tube through which a refrigerant flows,
the second tube is a coolant tube through which a coolant flows, and
a thickness of the coolant tube in a direction vertical to the flow direction of the third fluid is thicker than a thickness of the refrigerant tube in a direction vertical to the flow direction of the third fluid.

13. A heat exchanger comprising:
a heat exchanging unit including first tubes, in which a first fluid flows, second tubes, in which a second fluid flows, or both the first tubes and the second tubes, which are arranged in a stacked manner, the heat exchanging unit allowing at least one of the first fluid and the second fluid to exchange heat with a third fluid;
third fluid passages each of which is a space provided between adjacent tubes of the tubes of the heat exchanging unit, the third fluid flowing through the third fluid passages;
outer fins that are disposed in the third fluid passages and joined to at least one of outer surfaces of the first tubes and outer surfaces of the second tubes, the outer fins accelerating heat transfer between the fluids;
a first fluid tank unit extending in a stacking direction of the first tubes and including a first fluid space in or from which the first fluid flowing in the first tubes is collected or distributed; and
a second fluid tank unit extending in a stacking direction of the second tubes and including a second fluid space in or from which the second fluid flowing in the second tubes is collected or distributed, wherein
the first fluid tank unit and the second fluid tank unit include:
a header plate to which both of the first tubes and the second tubes are fixed;
a first intermediate plate member and a second intermediate plate member which are fixed to the header plate; and
a tank forming member fixed to the header plate and the second intermediate plate member and having the first fluid space and the second fluid space,
the header plate includes a first fluid through hole through which the first fluid flows, and a second fluid through hole through which the second fluid flows, the first intermediate plate member includes a first fluid through hole through which the first fluid flows, and a second fluid through hole through which the second fluid flows, the second intermediate plate member includes a first fluid through hole through which the first fluid flows, and a second fluid through hole through which the second fluid flows, the first tubes and the first fluid space of the first fluid tank unit communicate with each other through the first fluid through holes of the header plate, the first intermediate plate member and the second intermediate plate member, the second tubes and the second fluid space of the second fluid tank unit communicate with each other through the second fluid through holes of the header plate, the first intermediate plate member and the second intermediate plate member, the first tubes and the second tubes are arranged without overlapping each other in the flow direction of the third fluid, two of the header plate, the first intermediate plate member, and the second intermediate plate member are joined to each other, at least one of plate surfaces of the two joined to each other includes a plate-side groove portion extending in the flow direction of the third fluid, an in-groove space provided in the plate-side groove portion continuously extends from between the first fluid through hole and the second fluid through hole adjacent to each other to outside the first fluid tank unit and the second fluid tank unit, at least one of the outer fins is joined to both of the first tubes and the second tubes, an area of a joint surface between the first tubes and the at least one of the outer fins is different from an area of a joint surface between the second tubes and the at least one of the outer fins, and a number of the first tubes joined to the at least one of the outer fins and arranged in a flow direction of the third fluid is different from a number of the second tubes joined to the at least one of the outer fins and arranged in the flow direction of the third fluid.

14. The heat exchanger according to claim 11, wherein upstream ends of the first tubes are different, in position in the flow direction of the third fluid, from upstream ends of the second tubes.

15. The heat exchanger according to claim 12, wherein upstream ends of the first tubes are different, in position in the flow direction of the third fluid, from upstream ends of the second tubes.

* * * * *